United States Patent
Santi et al.

(10) Patent No.: US 9,613,244 B2
(45) Date of Patent: Apr. 4, 2017

(54) 2D INDICIA POSE ESTIMATION AND CONSEQUENT GRID LOCALIZATION AND/OR SYNCHRONIZATION

(71) Applicant: DATALOGIC IP TECH, S.R.L., Bologna (IT)

(72) Inventors: Stefano Santi, Bologna (IT); Lorenzo Vorabbi, Rimini (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 0 days.

(21) Appl. No.: 14/706,788

(22) Filed: May 7, 2015

(65) Prior Publication Data

US 2016/0328591 A1    Nov. 10, 2016

(51) Int. Cl.
  G06K 7/14    (2006.01)
  G06K 7/10    (2006.01)

(52) U.S. Cl.
  CPC ....... G06K 7/1456 (2013.01); G06K 7/10732 (2013.01); G06K 7/1408 (2013.01)

(58) Field of Classification Search
  CPC . G06K 7/1408; G06K 7/10732; G06K 7/1456
  See application file for complete search history.

(56) References Cited

U.S. PATENT DOCUMENTS

| | | | |
|---|---|---|---|
| 8,061,616 B2 | 11/2011 | Goren et al. | |
| 8,532,334 B2 | 9/2013 | Rhoads | |
| 8,873,797 B2 | 10/2014 | Reed et al. | |
| 2009/0057413 A1 | 3/2009 | Vinogradov et al. | |
| 2010/0078481 A1 | 4/2010 | Trajkovic et al. | |
| 2010/0155481 A1 | 6/2010 | Vinogradov et al. | |
| 2013/0223673 A1* | 8/2013 | Davis | G06K 9/78 382/100 |
| 2014/0080428 A1* | 3/2014 | Rhoads | G06F 17/30241 455/88 |
| 2014/0119593 A1 | 5/2014 | Filler | |

OTHER PUBLICATIONS

Hartley et al., *Multiple View Geometry in Computer Vision: Second Edition*, Cambridge University Press, New York City, 2003, 673 pages.

* cited by examiner

Primary Examiner — Sonji Johnson
(74) Attorney, Agent, or Firm — Seed IP Law Group LLP

(57) ABSTRACT

Systems and methods of operation for a machine-readable symbol reader for estimating the relative position, orientation and/or distance of a scanned target object or item labeled with two dimensional (2D) indicia, such as a digital watermark. Such estimation information may be provided to a localization process or a decoding process to assist such processes in decoding the 2D indicia from an image of the object labeled with the 2D indicia. The machine-readable symbol reader may include an aiming system which projects a light pattern onto a target object. The reader may capture one or more images of the target object while the light pattern is projected thereon and analyze at least one characteristic of the pattern to estimate position, orientation or distance of the target object relative to the machine-readable symbol reader. Such information may be used to improve decoding of the 2D indicia.

24 Claims, 16 Drawing Sheets

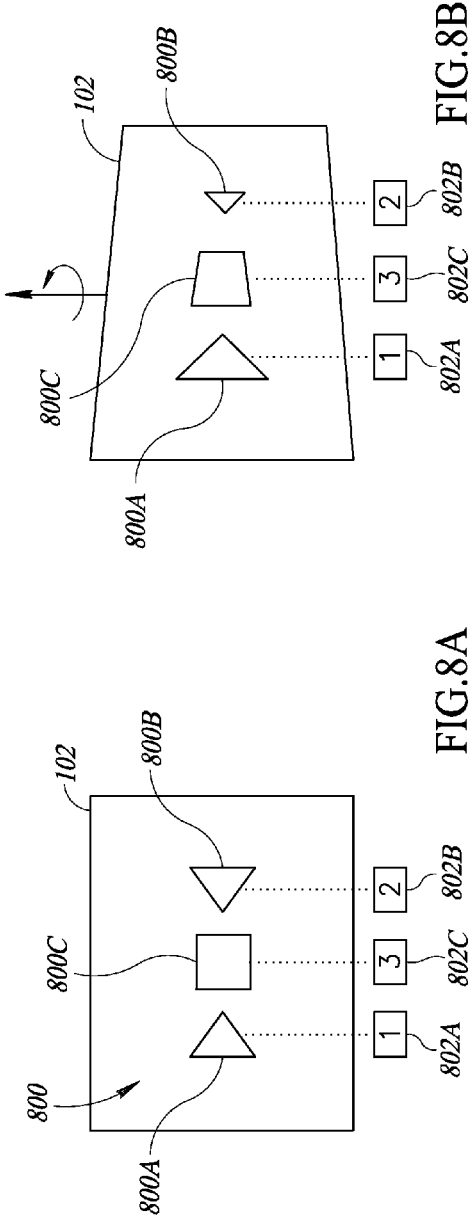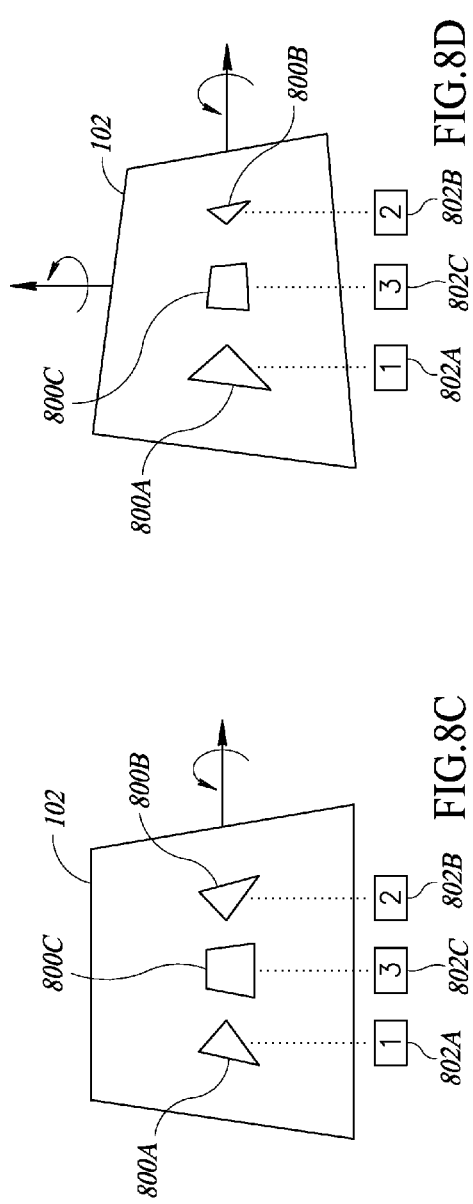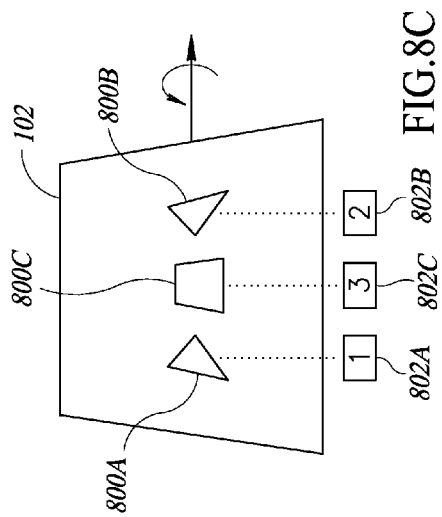

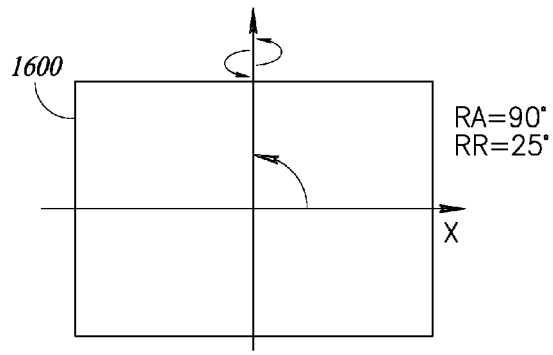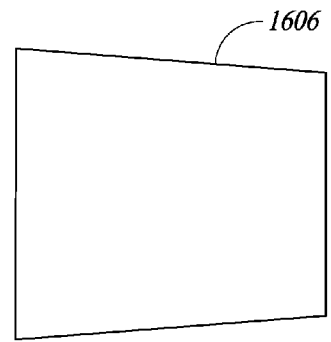
FIG.18A        FIG.18B
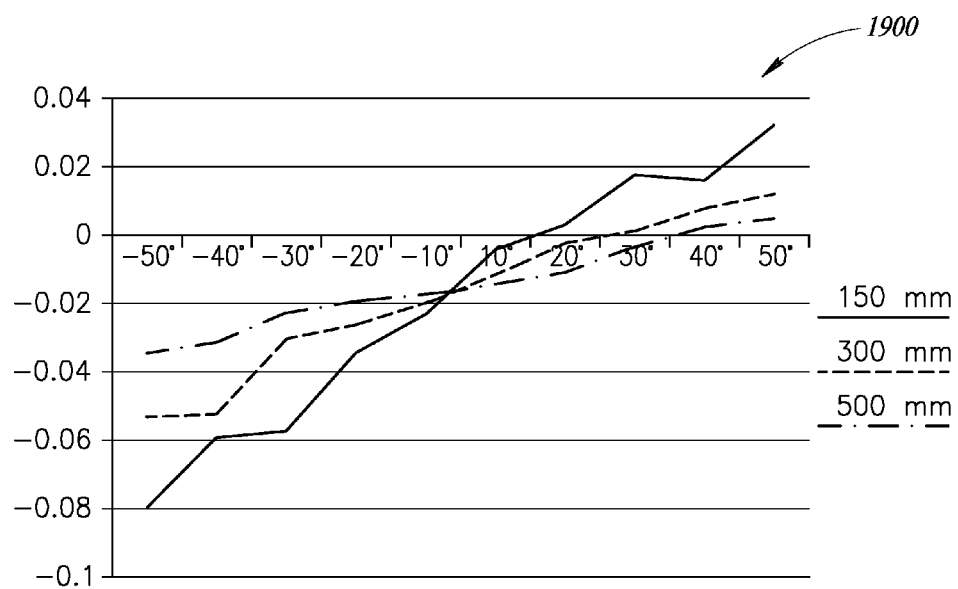
FIG.19

2D INDICIA POSE ESTIMATION AND CONSEQUENT GRID LOCALIZATION AND/OR SYNCHRONIZATION

BACKGROUND

Technical Field

The present disclosure generally relates to decoding machine-readable symbols, such as digital watermarks.

Description of the Related Art

Machine-readable symbols encode information in a form that can be optically read via a machine-readable symbol reader or scanner. Machine-readable symbols take a variety of forms, the most commonly recognized form being the linear or one-dimensional machine-readable symbol. Other forms include two-dimensional machine-readable symbols such as stacked code symbols, area or matrix code symbols, or digital watermarks. These machine-readable symbols may be made of patterns of high and low reflectance areas. For instance, a one-dimensional barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), International Article Number (EAN), Code 39, Code 128, Data Matrix, PDF417, etc.

Machine-readable symbols have widespread and varied applications. For example, machine-readable symbols can be used to identify a class of objects (e.g., merchandise) or unique objects (e.g., patents). As a result, machine-readable symbols are found on a wide variety of objects, such as retail goods, company assets, and documents, and help track production at manufacturing facilities and inventory at stores (e.g., by scanning objects as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a machine-readable symbol reader to allow the customer to redeem a coupon or to verify that the customer has purchased a ticket for the event.

Machine-readable symbols may also be used in data hiding or "steganography" applications. One form of data hiding is digital watermarking Digital watermarking is a process for modifying an object or content to embed a machine-readable signal or code into the content or object. In many instances, the data may be modified such that the embedded code or signal is imperceptible or nearly imperceptible to a user, yet may be detected through an automated detection process.

Digital watermarking systems may include two primary components: an embedding component that embeds a watermark in an object or content, and a reading component that detects or reads an embedded watermark. The embedding component (or "encoder") may embed a watermark by altering data samples representing media content (e.g., in an image) in the spatial, temporal or some other domain (e.g., Fourier, Discrete Cosine or Wavelet transform domains). The reading component (or "reader" or "decoder") may analyze target content to detect whether a watermark is present. In applications where the watermark encodes information (e.g., a message or payload), the reader may extract this information from a detected watermark.

Machine-readable symbol readers or scanners are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Machine-readable symbol readers may be fixed, for example, readers may be commonly found at supermarket checkout stands or other point of sale locations. Machine-readable symbol readers may also be handheld (e.g., hand-held readers or even smartphones), or mobile (e.g., mounted on a vehicle such as a lift vehicle or a fork lift).

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

The performance of 2D indicia localization and decoding processes is limited by their natural sensitivity to perspective distortion caused by the skew of an image or by more complex distortions caused by irregularly shaped surfaces. Since the 2D indicia localization and decoding processes are typically based on grid localization algorithms in the space or frequency domain, any distortion on the processed images due to projective or more complex distortions modifies the grid regularity, thereby limiting the tolerance of distortions and worsening the general decoding performance.

BRIEF SUMMARY

A digital watermark reader system may be summarized as including at least one imaging system which in operation captures images of a target object labeled with at least one digital watermark; at least one light generation system which, when activated, projects light onto the target object and when deactivated does not project light onto the target object; at least one processor operatively coupled to the at least one imaging system and the at least one light generation system; at least one nontransitory processor-readable storage medium operatively coupled to the at least one processor and storing at least one of data or instructions which, when executed by the at least one processor, cause the at least one processor to: activate the at least one light generation system; cause the at least one imaging system to capture at least one distortion detection image of the target object while the at least one light generation system is activated and projects light onto the target object; analyze the at least one captured distortion detection image to detect at least one characteristic of the light projected onto the target object by the at least one light generation system; estimate a distortion of the target object in the captured distortion detection image based at least in part on the analysis of the at least one captured distortion detection image; deactivate the at least one light generation system; cause the at least one imaging system to capture at least one watermark analysis image of the target object while the at least one light generation system is deactivated; and analyze the at least one watermark analysis image to decode the at least one digital watermark based at least in part on the estimated distortion of the target object in the captured distortion detection image.

When activated, the at least one light generation system may project a cross-shaped aiming pattern onto the target object, the cross-shaped aiming pattern may include a horizontal branch and a vertical branch, and the at least one processor may analyze the at least one captured distortion detection image to detect a rotation angle of at least one of the horizontal branch or the vertical branch of the cross-shaped aiming pattern.

When activated, the at least one light generation system may project a collimated light beam having a defined shape onto the target object, and the at least one processor may analyze the at least one captured distortion detection image to detect a deformation of the collimated light beam relative to the defined shape.

The at least one light generation system may include a three dimensional (3D) scanner, and the at least one processor may analyze the at least one capture distortion detection image to detect a 3D shape of the target object.

The at least one processor may estimate a three dimensional (3D) pose of the target object in the captured distortion detection image based at least in part on the analysis of the at least one captured distortion detection image; and may analyze the at least one watermark analysis image to decode the at least one digital watermark based at least in part on the estimated 3D pose of the target object in the captured distortion detection image.

The system may further include a motion detector operatively coupled to the at least one processor; and a trigger operatively coupled to the at least one processor; wherein the at least one processor: receives a signal from the motion detector which indicates movement of the digital watermark reader system by an operator; responsive to the receipt of the signal from the motion detector, activates the at least one light generation system; receives a signal from the trigger which indicates the trigger is activated by the operator; and responsive to the receipt of the signal from the trigger, deactivates the at least one light generation system and causes the at least one imaging system to capture at least one watermark analysis image.

The at least one processor may estimate a distance of the target object in the captured distortion detection image based at least in part on the analysis of the at least one captured distortion detection image; and may analyze the at least one watermark analysis image to decode the at least one digital watermark based at least in part on the estimated distance of the target object in the captured distortion detection image.

The at least one processor may estimate a distortion of the target object in the captured distortion detection image by selection of at least one of a plurality of pre-computed distortion models.

The at least one processor may estimate a distance of the target object in the captured distortion detection image based at least in part on the analysis of the at least one captured distortion detection image; and prior to the analysis of the at least one watermark analysis image to decode the at least one digital watermark, may subsample the at least one watermark analysis image based at least in part on the estimated distance of the target object.

When activated, the at least one light generation system may project an aiming pattern onto the target object, and the at least one processor may estimate a distance of the target object in the captured distortion detection image based at least in part on a determined location of at least a portion of the aiming pattern in the at least one captured distortion detection image.

The at least one processor may configure a decoder based at least in part on at least one of the estimated distortion of the target object in the captured distortion detection image or an estimated distance of the target object.

The at least one processor may generate a transformed watermark analysis image based at least in part on the estimated distortion of the target object in the captured distortion detection image; and may provide the transformed watermark analysis image to a decoder which decodes the at least one digital watermark from the transformed watermark analysis image.

A method of operation for a digital watermark reader system, the digital watermark reader system including at least one imaging system which in operation captures images of a target object labeled with a digital watermark, at least one light generation system which, when activated, projects light onto the target object and when deactivated does not project light onto the target object, at least one processor operatively coupled to the at least one imaging system and the at least one light generation system, and at least one nontransitory processor-readable storage medium operatively coupled to the at least one processor and storing at least one of data or instructions, may be summarized as including activating, by the at least one processor, the at least one light generation system; causing, by the at least one processor, the at least one imaging system to capture at least one distortion detection image of the target object while the at least one light generation system is activated and projects light onto the target object; analyzing, by the at least one processor, the at least one captured distortion detection image to detect at least one characteristic of the light projected onto the target object by the at least one light generation system; estimating, by the at least one processor, a distortion of the target object in the captured distortion detection image based at least in part on the analysis of the at least one captured distortion detection image; deactivating, by the at least one processor, the at least one light generation system; causing, by the at least one processor, the at least one imaging system to capture at least one watermark analysis image of the target object while the at least one light generation system is deactivated; and analyzing, by the at least one processor, the at least one watermark analysis image to decode the at least one digital watermark based at least in part on the estimated distortion of the target object in the captured distortion detection image. When activated, the at least one light generation system may project a cross-shaped aiming pattern onto the target object, the cross-shaped aiming pattern may include a horizontal branch and a vertical branch, and analyzing the at least one captured distortion detection image may include analyzing the at least one captured distortion detection image to detect a rotation angle of at least one of the horizontal branch or the vertical branch of the cross-shaped aiming pattern. When activated, the at least one light generation system may project a collimated light beam having a defined shape onto the target object, and analyzing the at least one captured distortion detection image may include analyzing the at least one captured distortion detection image to detect a deformation of the collimated light beam relative to the defined shape. The at least one light generation system may include a three dimensional (3D) scanner, and analyzing the at least one captured distortion detection image may include analyzing the at least one capture distortion detection image to detect a 3D shape of the target object.

Estimating a distortion of the target object in the captured distortion detection image may include estimating a three dimensional (3D) pose of the target object in the captured distortion detection image based at least in part on the analysis of the at least one captured distortion detection image, and analyzing the at least one watermark analysis image to decode the at least one digital watermark may include analyzing the at least one watermark analysis image to decode the at least one digital watermark based at least in part on the estimated 3D pose of the target object in the captured distortion detection image. The digital watermark reader system may include a motion detector operatively coupled to the at least one processor and a trigger operatively coupled to the at least one processor, and activating the at least one light generation system may include activating the at least one light generation system responsive to receiving a signal from the motion detector which indicates movement of the digital watermark reader system by an operator, and deactivating the at least one light generation system comprises deactivating the at least one light generation system responsive to receiving a signal from the trigger.

The method may further include estimating, by the at least one processor, a distance of the target object in the captured distortion detection image based at least in part on the analysis of the at least one captured distortion detection image; and analyzing, by the at least one processor, the at least one watermark analysis image to decode the at least one digital watermark based at least in part on the estimated distance of the target object in the captured distortion detection image. Estimating a distortion of the target object may include estimating a distortion of the target object in the captured distortion detection image by selection of at least one of a plurality of pre-computed distortion models.

The method may further include estimating, by the at least one processor, a distance of the target object in the captured distortion detection image based at least in part on the analysis of the at least one captured distortion detection image; and prior to the analysis of the at least one watermark analysis image to decode the at least one digital watermark, subsampling, by the at least one processor, the at least one watermark analysis image based at least in part on the estimated distance of the target object.

When activated, the at least one light generation system may project an aiming pattern onto the target object, and the method may further include estimating, by the at least one processor, a distance of the target object in the captured distortion detection image based at least in part on a determined location of at least a portion of the aiming pattern in the at least one captured distortion detection image.

The method may further include configuring, by the at least one processor, a decoder based at least in part on at least one of the estimated distortion of the target object in the captured distortion detection image or an estimated distance of the target object.

The method may further include generating, by the at least one processor, a transformed watermark analysis image based at least in part on the estimated distortion of the target object in the captured distortion detection image; and providing, by the at least one processor, the transformed watermark analysis image to a decoder which decodes the at least one digital watermark from the transformed watermark analysis image.

A digital watermark reader system may be summarized as including at least one imaging system which in operation captures images of a target object labeled with at least one digital watermark; at least one aiming system which, when activated, projects an aiming pattern onto the target object and when deactivated does not project the aiming pattern onto the target object; a trigger responsive to selective activation and deactivation by an operator; at least one processor operatively coupled to the at least one imaging system, the at least one aiming system, and the trigger; at least one nontransitory processor-readable storage medium operatively coupled to the at least one processor and storing at least one of data or instructions which, when executed by the at least one processor, cause the at least one processor to: activate the at least one aiming system; while the trigger is deactivated, iteratively: cause the at least one imaging system to capture at least one detection image of the target object while the at least one aiming system is activated and projects the aiming pattern onto the target object; analyze the at least one captured detection image to detect at least one characteristic of the aiming pattern projected onto the target object by the aiming system; estimate a distortion of the target object in the captured detection image based at least in part on the analysis of the at least one captured detection image; and store the estimated distortion of the target object as a latest estimated distortion in the at least one nontransitory processor-readable storage medium; responsive to receipt of an activation signal from the trigger: deactivate the at least one aiming system; cause the at least one imaging system to capture at least one watermark analysis image of the target object while the at least one aiming system is deactivated; and analyze the at least one watermark analysis image to decode the at least one digital watermark based at least in part on the latest estimated distortion of the target object in the captured detection image.

The at least one processor, while the trigger is deactivated, may iteratively estimate a distance of the target object based at least in part on the analysis of the at least one captured detection image; and store the estimated distance of the target object as a latest estimated distance in the at least one nontransitory processor-readable storage medium; and responsive to receipt of an activation signal from the trigger, prior to the analysis of the at least one watermark analysis image to decode the at least one digital watermark, may subsample the at least one watermark analysis image based at least in part on the latest estimated distance of the target object.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 8A-8D show various distortions of defined shapes projected by an aiming pattern of a machine-readable symbol reader when a target object is rotated at various angles, according to one illustrated implementation.

FIG. 18A-18B show the orientation of a target object at a third combination of RA and RR, according to one illustrated implementation.

FIG. 19 is a plot of a calibration parameter indicative of a rotational angle of a vertical branch of a cross-shaped aiming pattern of a machine-readable symbol reader, according to one illustrated implementation.

DETAILED DESCRIPTION

Figure 1:
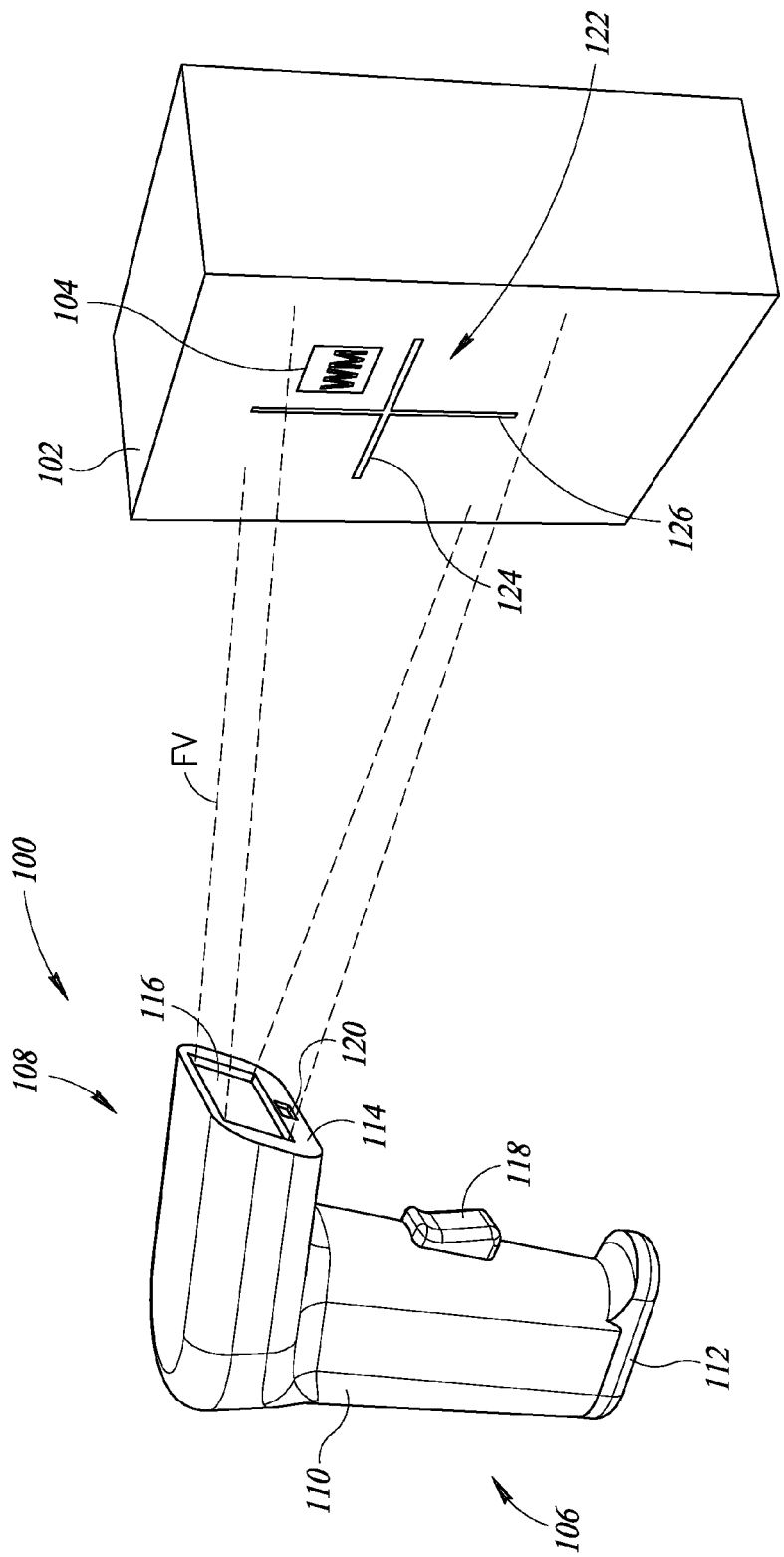
FIG. 1 is a perspective view of a machine-readable symbol reader and target object, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations. In other instances, well-known mathematical and statistical methods for performing statistical analyses and other well-known mathematical operation have not been described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure are directed to systems and methods for estimating the position and/or orientation ("pose") of a scanned target object or item labeled with two dimensional (2D) indicia, such as a digital watermark. Advantageously, such pose estimation information may be provided to a localization process or a decoding process to assist such processes in decoding the 2D indicia from an image of the object labeled with the 2D indicia. For example, in some implementations, a decoder may be configured with parameters based on the estimated pose of the target object. As another example, in some implementations captured images may be pre-processed with a transformation, such as a collineation (planar homography) transform or a more general transformation, that is determined according to the target object's estimated pose and/or shape, in the sense that different shapes having the same pose may lend themselves to slightly different transforms. Using the systems and methods disclosed herein, decoders may successfully decode 2D indicia on target objects that include irregular surfaces and/or are captured at greatly skewed angles.

FIG. 1 shows a handheld machine-readable symbol reader or scanner 100 acting upon a target object 102 labeled with a digital watermark 104. In practice, the digital watermark 104 may not be visible to an operator and in most cases may be spread out through the whole surface (in this case even the 6 sides of the target object 102). The reader or scanner 100 may be an imaging based machine-readable symbol reader. The handheld machine-readable symbol reader 100 includes a gripping portion 106 shaped and sized to be grasped by an operator's hand and a scanning head portion 108 extending from an upper portion 110 of the gripping portion. A lower portion 112 of the gripping portion 106 a may be shaped and sized to be received in a docking station (not shown). The machine-readable symbol reader 100 includes a front wall region 114 on the scanning head portion 108. The scanning head portion 108 also includes a transparent window 116 present on the front wall 114 behind which is positioned an imaging system, as discussed below.

The machine-readable symbol reader 100 may be used in at least one of a handheld mode or a fixed position mode. In the fixed position mode, the reader 100 may be received in a docking station and the target object 102 having a watermark 104 may be brought within the field of view (FV) of the machine-readable symbol reader to have the reader 100 read or detect the digital watermark 104. In the handheld mode, the reader 100 may be carried by an operator and positioned such that the surface of the target object 102 carrying the digital watermark 104 is within the field of view (FV) of the reader. In the handheld mode, imaging and decoding of the target digital watermark 104 may be initiated by the operator depressing a trigger 118, for example.

For the purpose of this description, a handheld imaging based machine-readable symbol system is discussed. However, it will be apparent to one of ordinary skill in the art that the techniques and devices described herein can be practiced advantageously with stationary, bi-optic, or other types of readers or scanners.

The machine-readable symbol reader 100 may also include an aiming system 120 positioned on the front wall 114 of the scanning head portion 108 of the reader. In the illustrated implementation, the aiming system 120 projects a cross-shaped aiming pattern 122 onto the target object 102. The cross-shaped aiming pattern 122 includes a horizontal branch 124 and a vertical branch 126 which is orthogonal to the horizontal branch. Such aiming pattern 122 allows the operator to aim the machine-readable symbol reader 100 toward the digital watermark 104 provided on the surface of the target object 102. As discussed further below, the aiming pattern 122 is utilized to estimate the relative pose of the target object 102 and/or to estimate the distance of the object from the machine-readable symbol reader 100.

Figure 2:
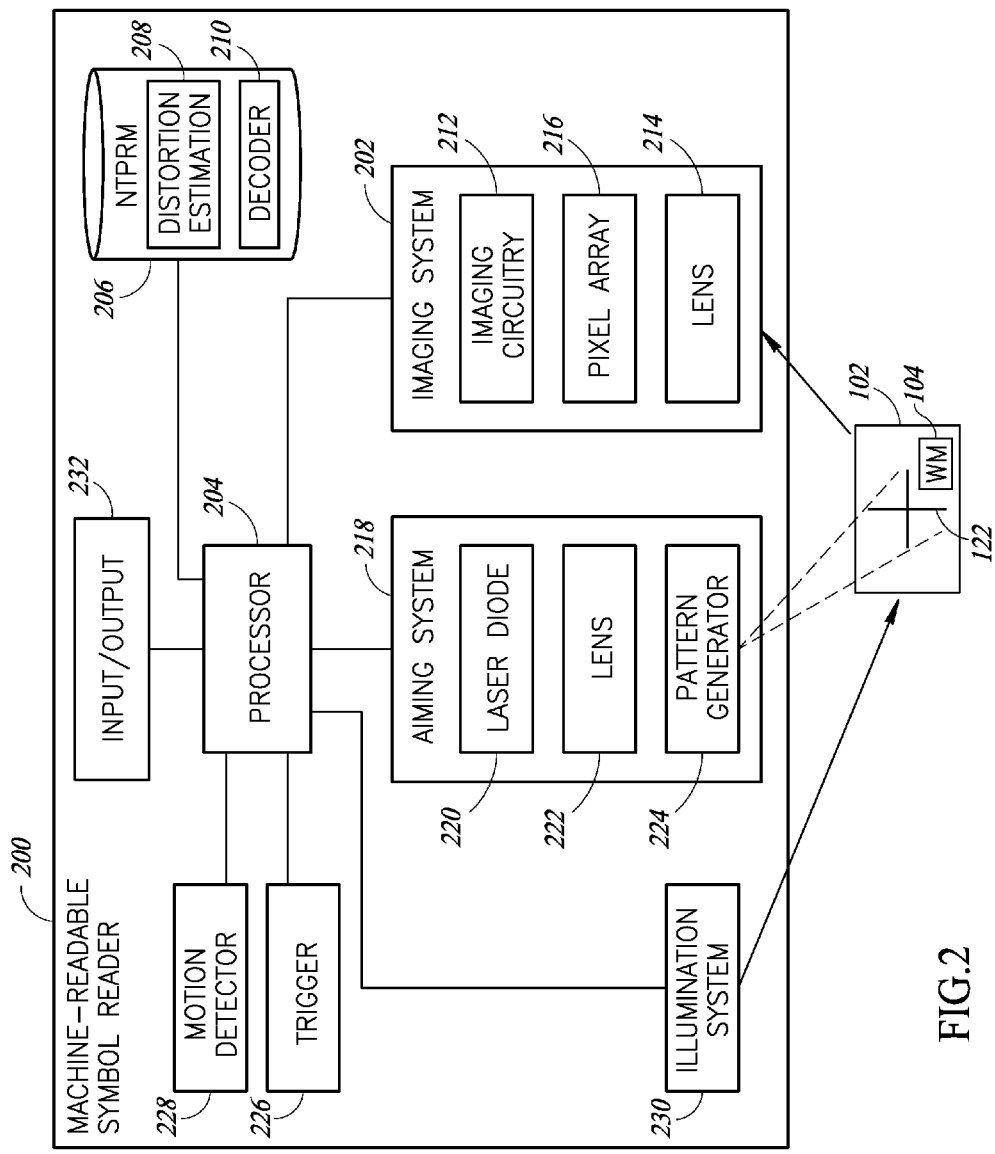
FIG. 2 is a functional block diagram of a machine-readable symbol reader, according to one illustrated implementation.

FIG. 2 is a block diagram of an imaging based machine-readable symbol reader 200 in accordance with some implementations of the present disclosure. The machine-readable symbol reader 200 may be similar or identical to the machine-readable symbol reader 100 of FIG. 1. The machine-readable symbol reader 200 includes an imaging system 202 which captures image frames of graphical indicia such as the digital watermark 104 of FIG. 1 present in the field of view (FV) of the imaging system 202. The reader 200 also includes one or more processors 204 operatively coupled to a nontransitory processor-readable medium 206 which stores distortion estimation logic 208 and decoder logic 210. The decoder logic 210 decodes encoded indicia within a captured image frame. The distortion estimation logic 208 and the decoder logic 210 may be executed by the processor 204. In some implementations, one or both of the distortion estimation logic 208 and the decoder logic 210 are implemented by multiple processors, by hardware, or by any combination thereof.

The imaging system 202 includes imaging circuitry 212, focusing optics including one or more imaging or focusing lens 214, and a photo sensor or pixel array 216. The focusing lens 214 focuses light reflected and scattered from the target digital watermark 104 through an aperture onto the pixel/photo sensor array 216. Thus, the lens 214 focuses an image of the target digital watermark 104 (assuming the watermark is within the FV) onto the array of pixels comprising the pixel array 216, thereby enabling the pixel array to capture an image of a target object 102 within a FV of the imaging system during an exposure period. The FV of the imaging system 202 includes both a horizontal and a vertical field of view. The FV of the imaging system 202 may be a function of both the configuration of the sensor array 216 and the optical characteristics of the imaging lens 214 and the distance and orientation between the array 216 and the imaging lens.

The sensor array 216 may include a charged coupled device (CCD), a complementary metal oxide semiconductor (CMOS), or other imaging pixel array, operating under the control of the imaging circuitry 212. The sensor array 216 may have various width and height dimensions in pixels, such as 640×480 pixels, 752×480 pixels, 1280×1024 pixels, 1600×1200, other combinations of width and height dimensions, or any sub-windows thereof.

The machine-readable symbol reader 200 includes an aiming system 218 to generate the visible aiming pattern 124 to aid the operator in aiming the machine-readable symbol reader 200 at the target digital watermark 104. In some implementations, the aiming system 218 may include a laser diode 220, a focusing lens 222 and a pattern generator 224 for generating the desired aiming pattern 124.

In some implementations, the aiming pattern 124 is used by the operator to focus on the target digital watermark 104 on the target object 102. Upon focusing, the operator depresses a trigger 226 to read or capture an image of the target digital watermark 104. In some implementations, the machine-readable symbol reader 200 has a two-position trigger 226, where the first position activates the aiming system 218 and the second position activates scanning. In some implementations, the machine-readable symbol reader 200 includes a motion detector 228 (e.g., accelerometer) that is used to activate the aiming system 218 upon detection of movement of the reader, which may signify that an operator has picked up the reader for a scanning operation.

In some implementations, the machine-readable symbol reader 200 may include a flood illumination system 230 to illuminate the target digital watermark 104. The flood illumination system 230 may direct a flood illumination pattern towards the target digital watermark 104. The illumination from the flood illumination system 230 may be reflected by the target digital watermark 104. The reflected light then passes through the imaging lens 214 and is focused onto the sensor array 216 of the imaging system 202.

As discussed further below, the decoder logic 210 may decode any decodable image within one or more images captured by the imaging system 202. If the decoding is successful, decoded data, representative of the data/information coded in the digital watermark 104, is then output via a data input/output system 232, which may include one or more of a wired/wireless communications port, a display, LEDs, an audio output, touchscreen, keys, buttons, etc. Upon a successful imaging and decoding of the digital watermark 104, the input/output system 232 may provide feedback to the operator in the form of a visual indicator and/or an audible indicator.

The distortion estimation logic 208 and the decoder logic 210 may be implemented in any suitable manner, including hardware, software, electrical circuitry, firmware, on an application specific integrated circuit (ASIC), on a programmable gate array (PGA), or any combination thereof.

Figure 3:
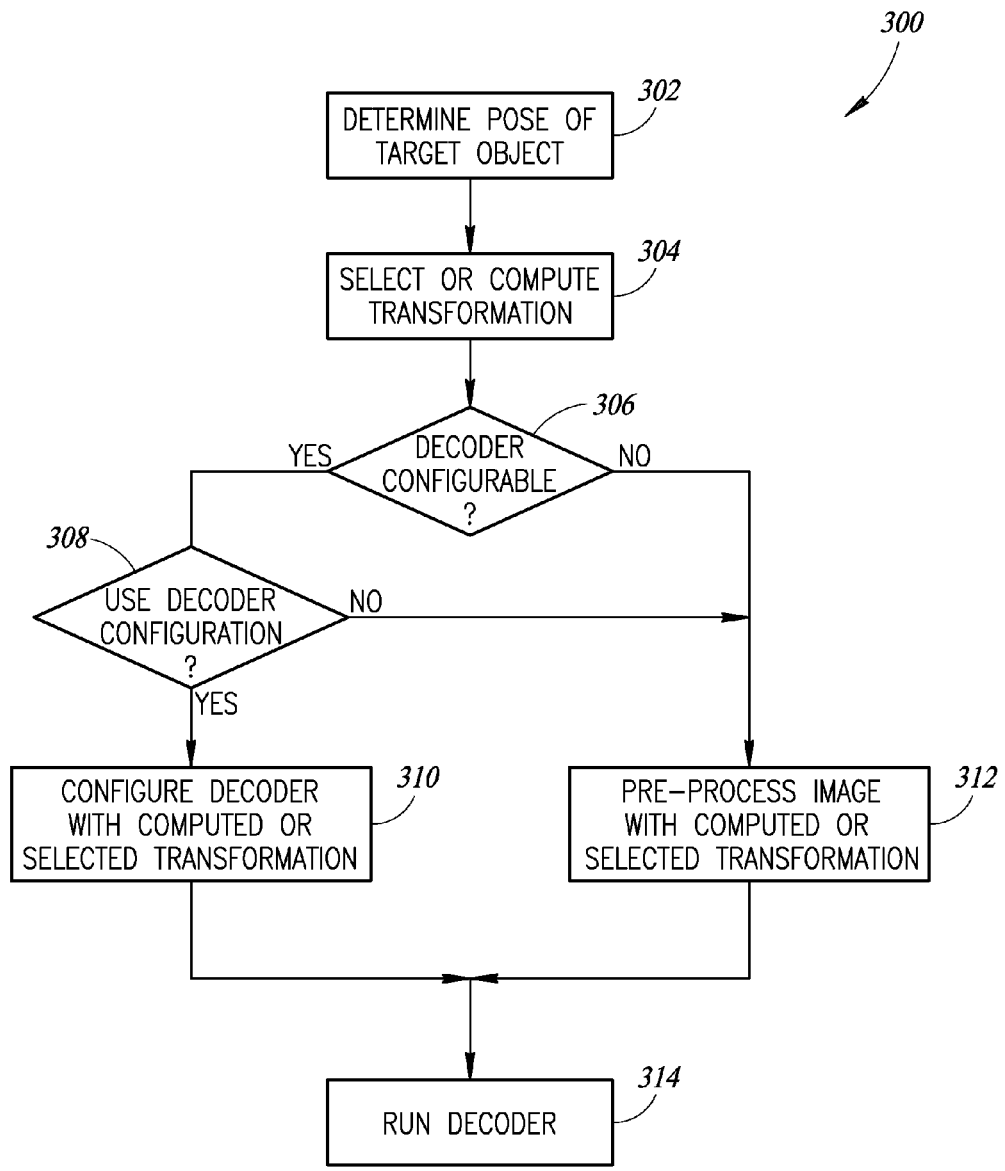
FIG. 3 is a flow diagram of a method of operation for a machine-readable symbol reader to decode 2D indicia from skewed or irregularly shaped objects, according to one illustrated implementation.

FIG. 3 is a flow diagram of a high-level method 300 for a decoder process that has improved tolerance for decoding skewed or irregular 2D indicia, such as digital watermarks. The method 300 may be executed by a machine-readable symbol reader, such as the machine-readable symbol readers 100 and 200 of FIGS. 1 and 2, respectively. At 302, at least one processor of the reader determines the pose of a target object labeled with 2D indicia. Methods for determining the pose of the target object are discussed in detail below.

Once the pose of the target object is known or estimated, at least one processor of the reader may determine the transformation to be applied to the captured image to rectify at least a portion of the image containing the indicia at 304. Generally, the at least one processor of the reader determines the image transformation which allows for a mapping of the points of the captured image into a single plane, as though the image of the target object had been captured without any kind of distortion. The at least one processor of the reader may compute the transformation on the fly or the transformation may be selected as the best transformation available among a set of pre-computed transformation models.

If the decoder logic of the reader is configurable (i.e., decision 306=yes), the at least one processor of the reader may determine whether to use the decoder configuration at 308. If the at least one processor determines to use the decoder configuration (i.e., decision 308=yes), the at least one processor configures the decoder logic with the parameters of the computed or selected transform at 310. At 314, the decoder logic may execute a grid search algorithm which may sample the captured image non-uniformly according to the transformation determined at 304.

If the at least one processor determines not to use the decoder configuration (i.e., decision 308=no), or if the decoder logic of the reader is not configurable (i.e., decision 306=no), the at least one processor of the reader may pre-process at least a portion of the captured image according to the transformation determined at 304 to generate an auxiliary image at 312. At 314, the auxiliary image is processed by the decoder to decode the digital watermark.

Figure 4:
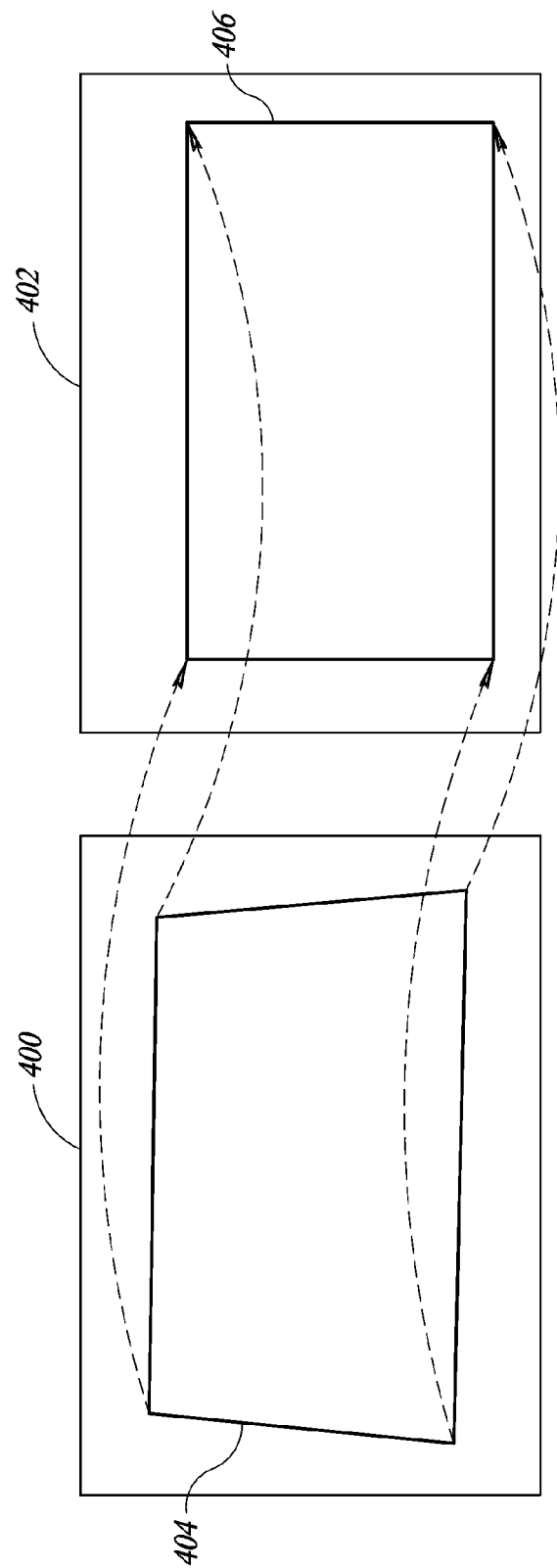
FIG. 4 is a simplified diagram of an original image (left) with perspective distortion and a corrected image (right) that has been pre-processed to correct the perspective distortion, according to one illustrated implementation.

FIG. 4 shows an example of image pre-processing for creating a rectified auxiliary image where the perspective distortion of a first image 400 (left) has been corrected in an auxiliary image 402 (right). Specifically, a four corner polygon 404 in the original image is transformed into a rectangle 406 in the auxiliary image, and all of the points in the original image 400 are resampled according to a rectification map to generate the auxiliary or corrected image 402. As noted above, in cases where the decoder supports configuration, the intermediate step of computing the auxiliary image 402 may be skipped, resulting in a more efficient overall decoding process.

Figure 5:
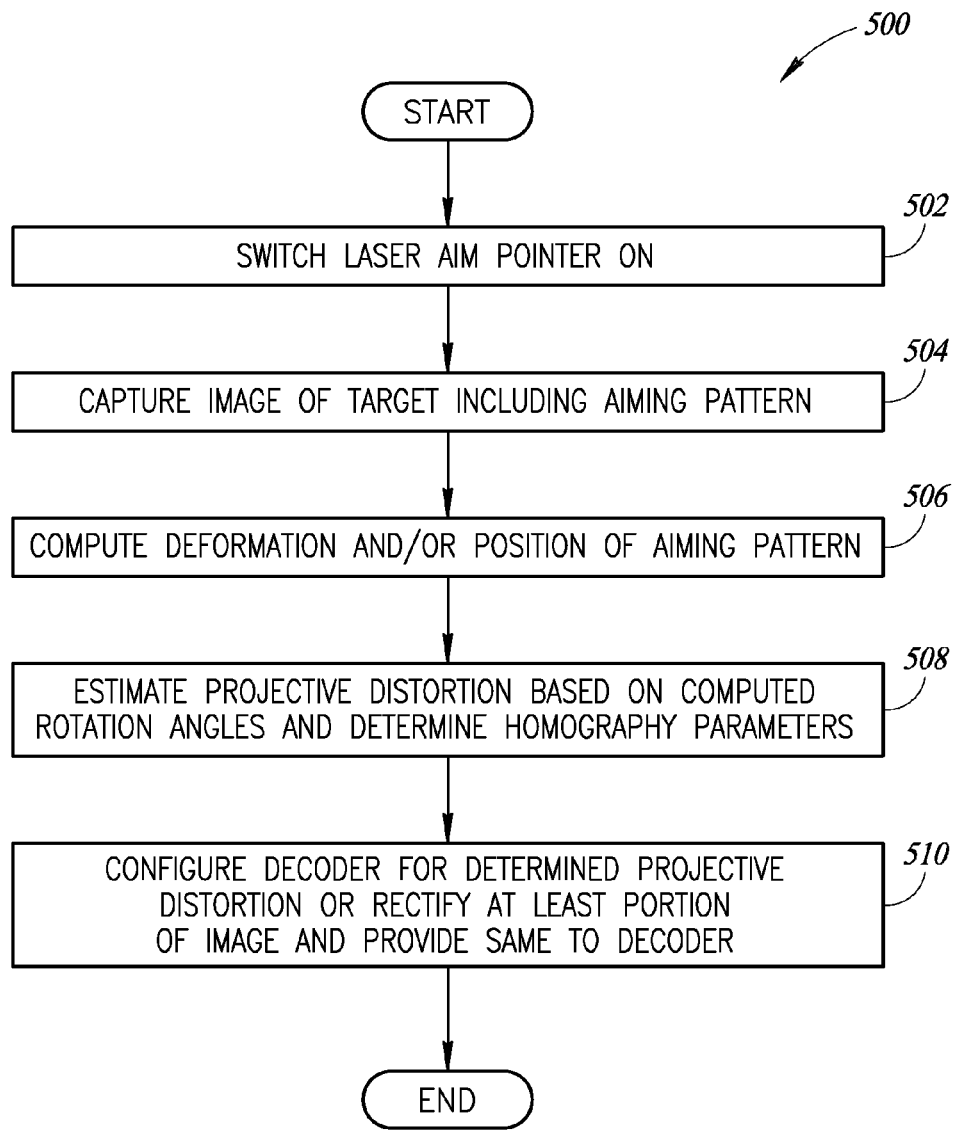
FIG. 5 is a flow diagram of a method of operation to determine the pose of a target object using a machine-readable symbol reader that has an aiming system which projects a cross-shaped aiming pattern having a horizontal branch and a vertical branch, according to one illustrated implementation.

FIG. 5 illustrates a flow diagram for a method of determining the pose of an object using a machine-readable symbol reader that has an aiming system which projects a cross-shaped aiming pattern having a horizontal branch and a vertical branch (see FIGS. 1 and 2).

At 502, the at least one processor of the reader turns on the laser aim pointer of the aiming system. For example, the at least one processor may turn on the laser aim pointer responsive to an operator picking up the reader, or responsive to an operator activating a trigger of the reader.

At 504, the at least one processor causes the imaging system of the reader to capture an image of the target object which includes the aiming pattern.

At 506, the at least one processor analyzes the captured image to compute the deformation and/or position of the cross-shaped aiming pattern. Since the laser diode source (FIG. 2) of the aiming pattern is out of the principal optical axis of the lens of the imaging system, and/or the planes in the 3D space identified either by the horizontal branch and/or by the vertical branch of the cross-shaped aiming pattern do not contain the principal optical axis of the lens of the imaging system, the horizontal branch and/or the vertical branch of the cross-shaped aiming pattern will appear rotated and/or scaled to the image sensor as the pose of the captured target object changes.

Figure 6B:
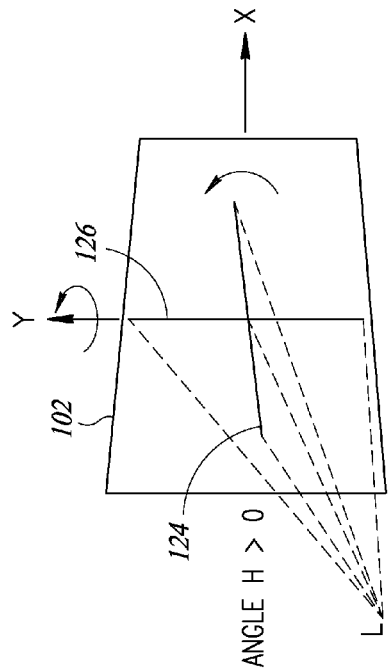
FIGS. 6A-6D show various rotation angles of a horizontal branch and a vertical branch of a cross-shaped aiming pattern of a machine-readable symbol reader, according to one illustrated implementation.
Figure 6D:
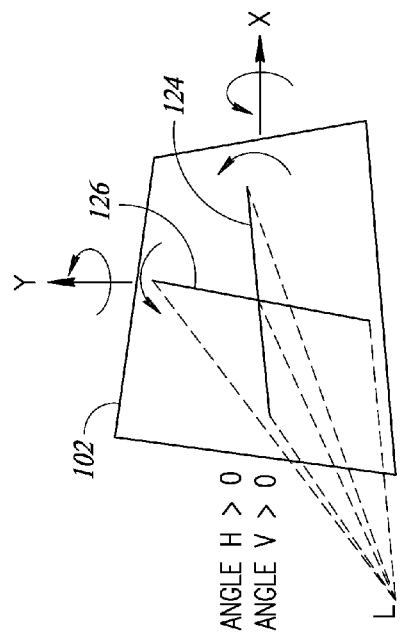
Figure 6A:
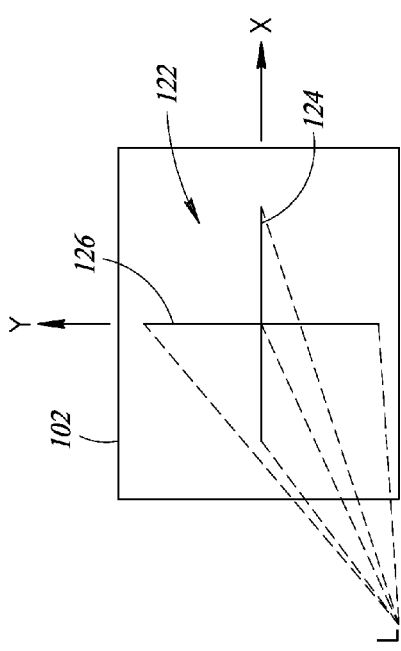
Figure 6C:
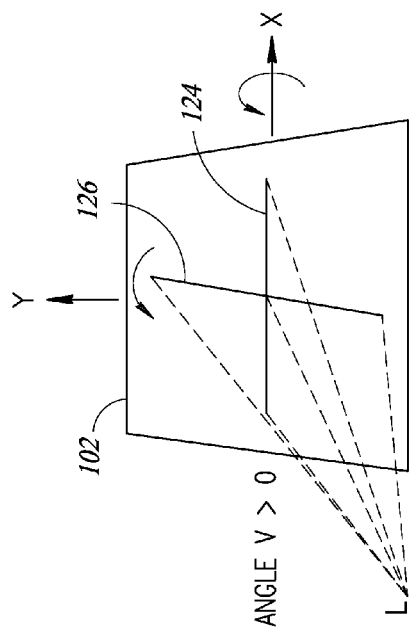

FIGS. 6A-6D illustrate various example rotation angles of the horizontal branch 124 and the vertical branch 126 of the cross-shaped aiming pattern 122. In particular, FIG. 6A shows a captured image when the target object 102 is nearly perpendicular to the optical axis of the reader. FIG. 6B shows a captured image when the target object 102 has been rotated about the y-axis (of the target object's system of coordinates) by an angle which causes a counterclockwise rotation of the horizontal branch of an angle H. FIG. 6C shows a captured image when the target object 102 has been rotated about the x-axis (of the target object's system of coordinates) by an angle which causes a clockwise rotation of the vertical branch of an angle V. FIG. 6D shows a captured image when the target object has been rotated about both the x-axis and the y-axis, which produces a rotation of both the horizontal branch 124 and the vertical branch 126.

The relation between the rotation of the target object 102 and the resulting effects on the rotation of the horizontal branch 124 and/or the vertical branch 126 may be computed according to known projective geometry principles, or may be stored in a look-up table in a nontransitory processor-readable medium of the machine-readable symbol reader during a calibration process.

At 508, once the rotation angles are available, the at least one processor estimates the projective distortion of the target object and determines the homography parameters. Examples of methods for performing these acts are discussed in further detail below.

At 510, the at least one processor may configure the decoder logic for the given projective distortion or, if the decoder logic does not support configuration, at least a portion of the image may be rectified according to the determined parameters in a pre-processing phase and then passed to the decoder logic for decode processing.

It is noted that for efficiency purposes, the projective distortion parameters may be pre-computed or hard-coded for a set of rotation angles of the horizontal branch and the vertical branch.

Figure 7:
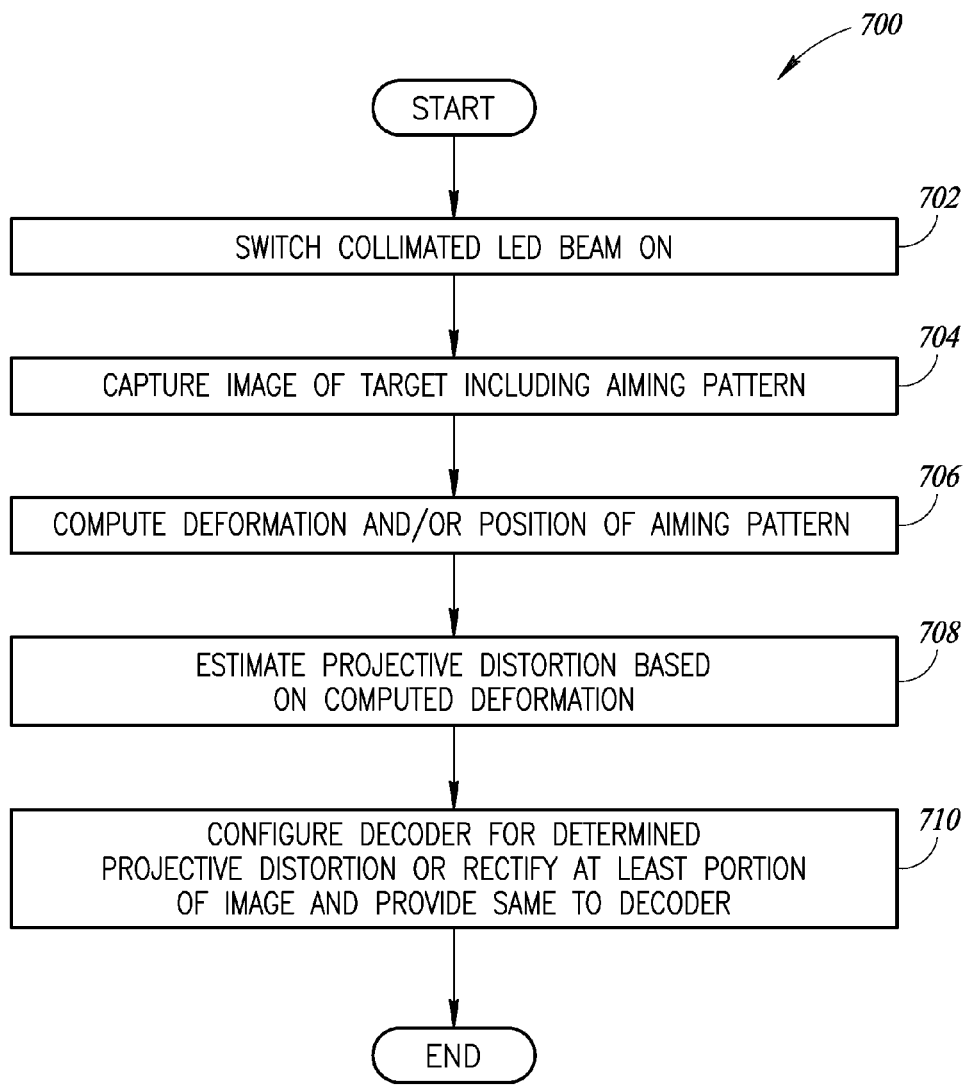
FIG. 7 is a flow diagram of a method of determining the pose of an object using a machine-readable symbol reader that has an aiming system which includes a collimated LED beam that projects an aiming pattern having a plurality of defined shapes onto the target object, according to one illustrated implementation.

FIG. 7 illustrates a flow diagram for a method of determining the pose of an object using a machine-readable symbol reader which has an aiming system which includes a collimated LED beam that projects an aiming pattern having a plurality of defined shapes onto the target object.

At 702, the at least one processor of the reader turns on the collimated LED beam of the aiming system. For example, the at least one processor may turn on the collimated LED beam responsive to an operator picking up the reader, or responsive to an operator activating a trigger of the reader.

At 704, the at least one processor causes the imaging system of the reader to capture an image of the target object which includes the aiming pattern.

At 706, the at least one processor analyzes the captured image to compute the deformation and/or position of the aiming pattern. Since the collimated LED beam generated by the aiming system is out of the principal optical axis of the lens of the imaging system, the defined shapes of the aiming pattern will appear deformed to the image sensor as the pose of the captured target object changes.

FIGS. 8A-8D illustrate various deformations for an collimated LED beam aiming pattern 800 which includes three defined shapes 800A, 800B and 800C produced by corresponding LEDs 802A, 802B and 802C, respectively. FIG. 8A shows a captured image when the target object 102 is nearly perpendicular to the optical axis. FIG. 8B shows a captured image when the target object 102 has been rotated about the y-axis (of the target object's system of coordinates). FIG. 8C shows a captured image when the target object 102 has been rotated about the x-axis (of the target object's system of coordinates). FIG. 8D shows a captured image when the target object 102 has been rotated about both the x-axis and the y-axis.

The relation between the rotation of the target object 102 and the resulting effects on the deformations of the defined shapes 800A-800C may be computed according to known projective geometry principles, or may be stored in a look-up table in a nontransitory processor-readable medium during a calibration process for the reader.

At 708, once the defined shape deformations are available, the at least one processor estimates the projective distortion of the target object and determines the homography parameters. Examples of methods for performing these acts are discussed in further detail below.

In the example illustrated in FIGS. 8A-8D, the central square shape 800C may be used to provide an increased depth of field for the reader.

At 710, the at least one processor may configure the decoder logic for the estimated projective distortion or, if the decoder logic does not support configuration, at least a portion of the image may be rectified according to the determined parameters in a pre-processing phase and then passed to the decoder logic for processing.

Figure 9:
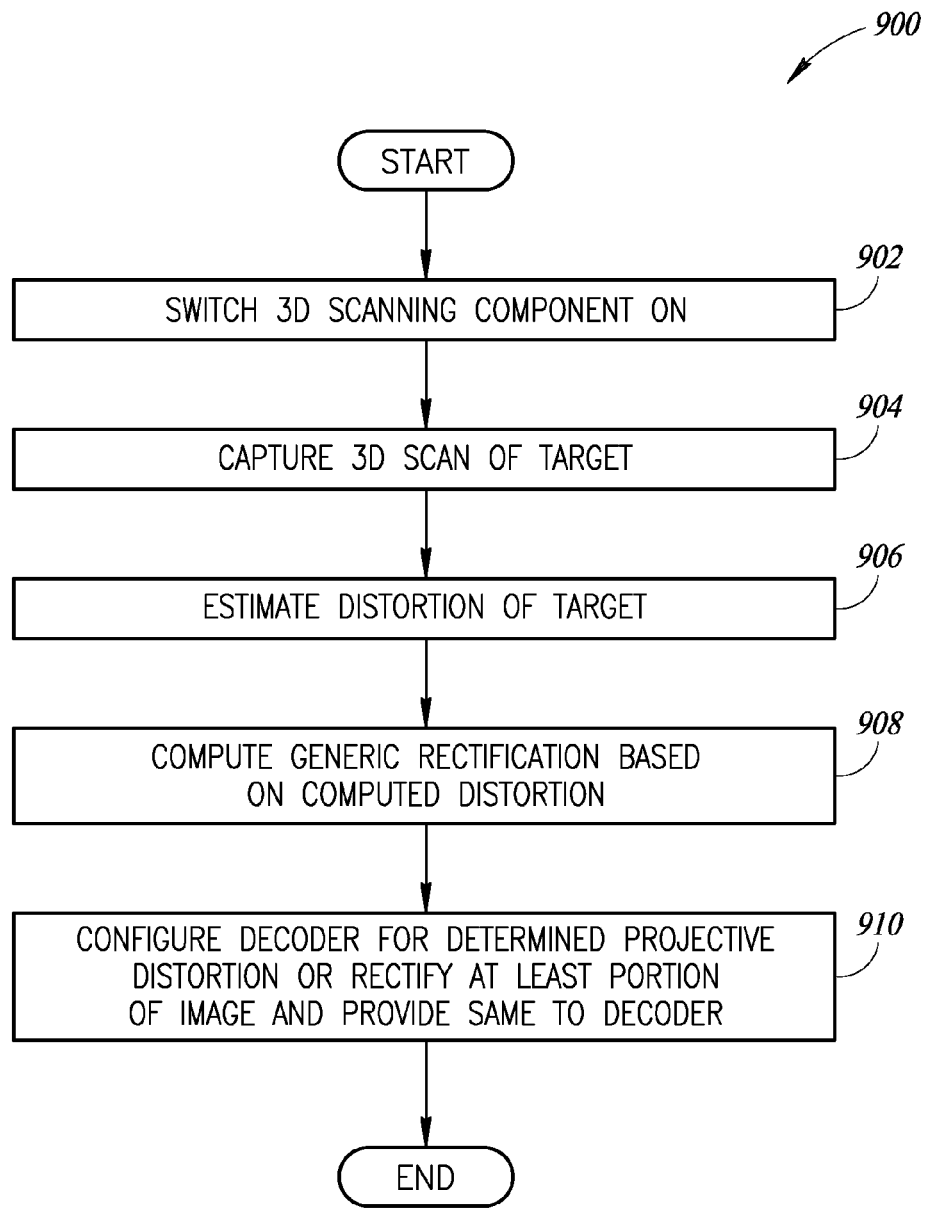
FIG. 9 is a flow diagram of a method of determining the pose of an object using a machine-readable symbol reader that has a three-dimensional scanner that projects a cloud of points onto the target object, according to one illustrated implementation.

FIG. 9 illustrates a flow diagram of a method of determining the pose of an object using a machine-readable symbol reader that has a three-dimensional (3D) scanner which projects a cloud of points onto the target object. The 3D scanner may utilize any type of 3D scanning technology, such as time of flight, structured light, or laser line triangulation.

At 902, the at least one processor of the reader turns on the 3D scanner. For example, the at least one processor may turn on the 3D scanner responsive to an operator picking up the reader, or responsive to an operator activating a trigger of the reader.

At 904, the at least one processor causes at least one of the 3D scanner or the imaging system of the reader to capture a 3D scan of the target object. At 906, the at least one processor analyzes the 3D scan to estimate the distortion or irregular surfaces of the target object. At 908, once the deformations are available, the at least one processor computes a generic rectification of the target object.

At 910, the at least one processor may configure the decoder logic for the determined transformation parameters or, if the decoder logic does not support reconfiguration, at least a portion of the image may be rectified according to the determined parameters in a pre-processing phase and then passed to the decoder logic for processing.

Figure 10:
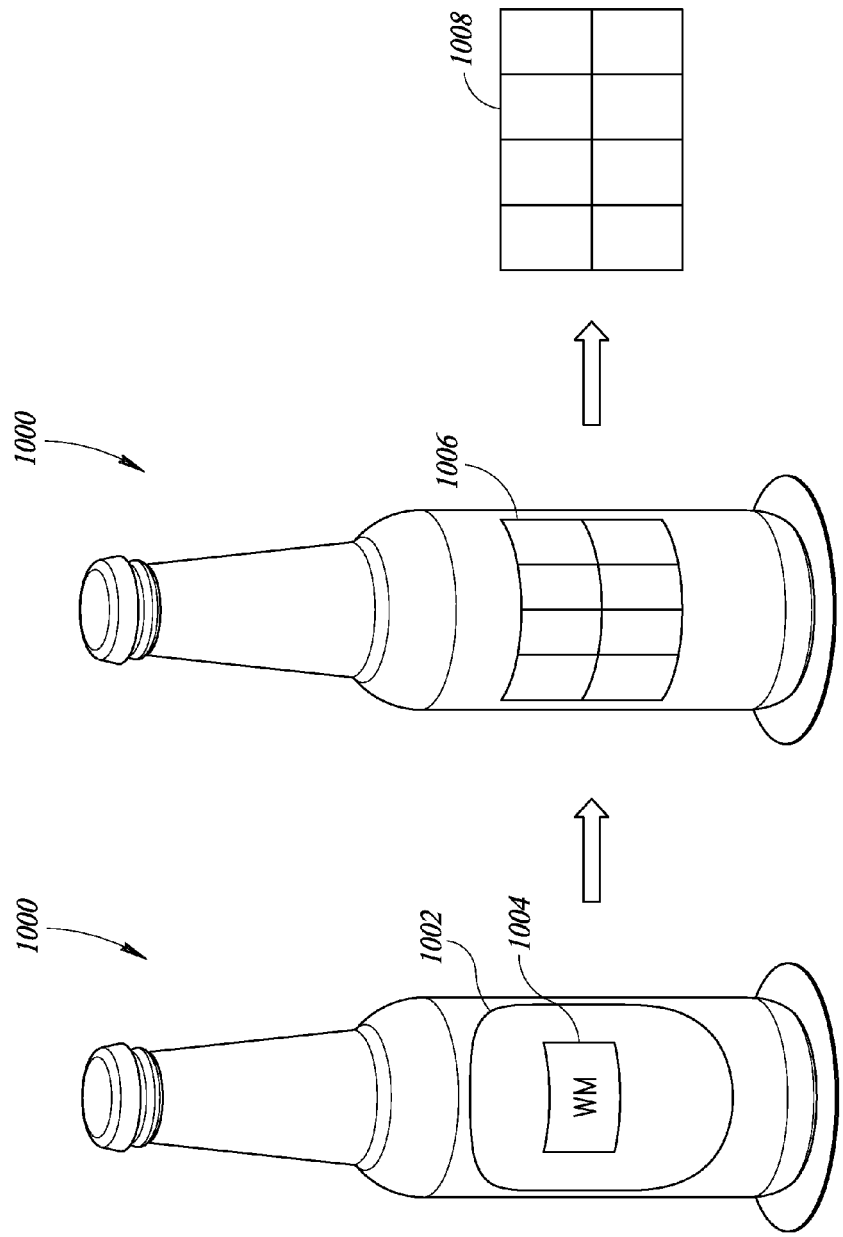
FIG. 10A shows a bottle including a label having a 2D digital watermark thereon, according to one illustrated implementation.
FIG. 10B shows the bottle of FIG. 10A and information from a cloud of points output from a 3D scanner, which includes a plurality of non-uniformly distorted rectangles, according to one illustrated implementation.
FIG. 10C shows the result of a piece-wise planar transformation which maps the non-uniformly distorted rectangles of FIG. 10B into a rectified form, according to one illustrated implementation.

FIGS. 10A-10C illustrate the principle of the method 900. FIG. 10A shows a bottle 1000 having a label 1002 which may include a digital watermark 1004 or other 2D indicia. FIG. 10B illustrates the information from a cloud of points output from the 3D scanner, which includes a plurality of non-uniformly distorted rectangles 1006 which are used for a generic rectification. As shown in FIG. 10C, a piece-wise generic rectification maps the non-uniformly distorted rectangles 1006 into their rectified form 1008. In some implementations, a simplified version of a 3D scanner may be obtained using an array of at least three non-collinear proximity sensors. For example, one such proximity sensor that may suitable is model VL6180X available from STMicroelectronics.

Figure 11:
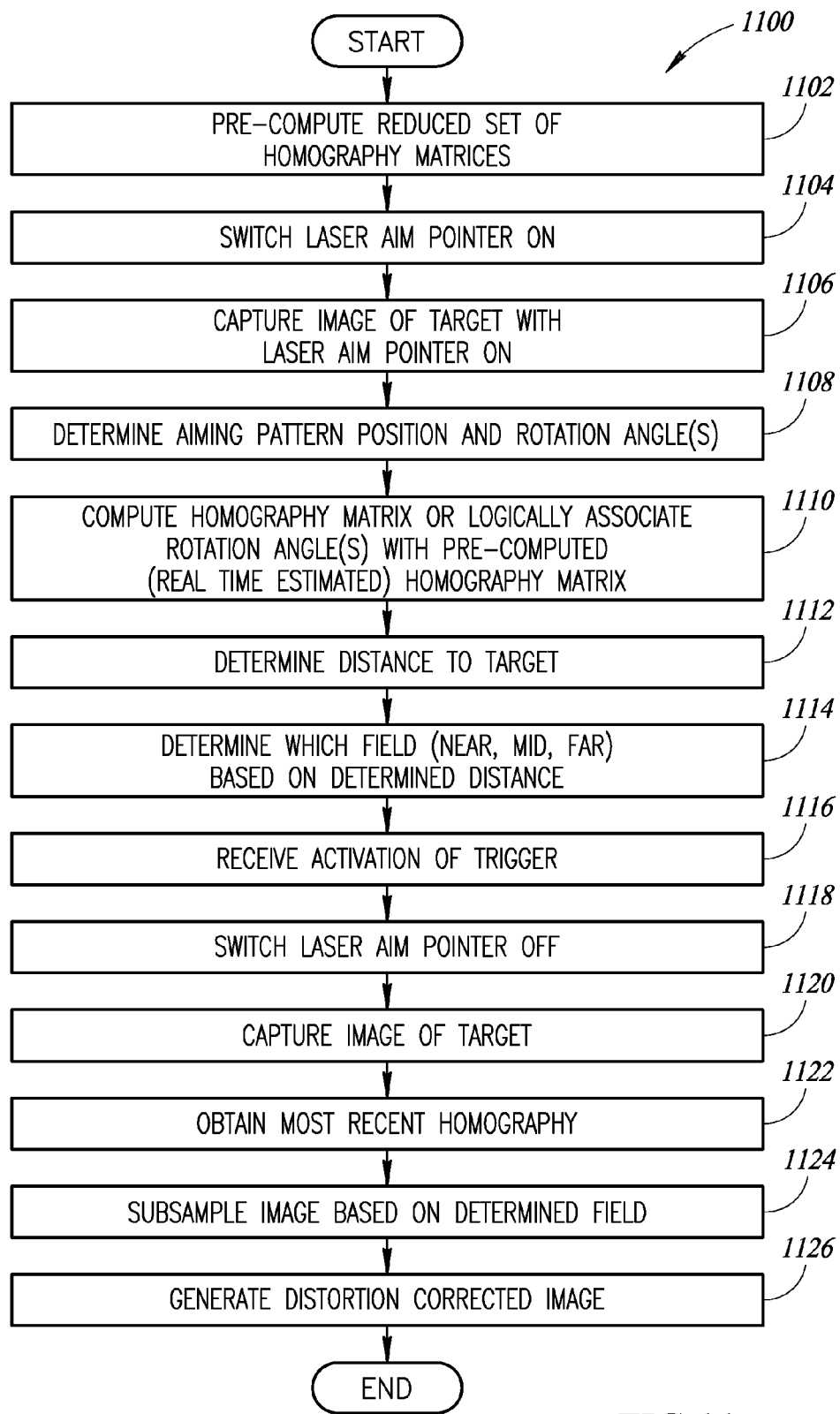
FIG. 11 is a flow diagram of a method of operation for a machine-readable symbol reader to determine a pose of a target object labeled with 2D indicia, according to one illustrated implementation.

FIG. 11 is a flow diagram of a method 1000 of operation for a machine-readable symbol reader to determine a pose of a target object labeled with 2D indicia. The method 1000 may be performed utilizing a machine-readable symbol reader that includes a laser aiming system which projects a cross-shaped aiming pattern, such as the machine-readable symbol readers 100 and 200 discussed above.

At 1102, a reduced set of homography matrices is precomputed for a number of determined rotations of the branches of the cross-shaped aiming pattern. Such matrices may be pre-computed off-line (e.g., during a development or calibration process) and then stored in a nontransitory processor-readable medium of the machine-readable symbol reader.

It is noted that in some implementations the homography matrices may be hard-coded in a nontransitory processor-readable medium of the reader (i.e., computed off-line and bounded to the application code at compilation time) and/or computed from the reader processing unit at some point of the reader operation before the user shows intention to scan an item (e.g., at reader power up), and/or computed in real-time once the object pose has been estimated. Thus, although in some implementations the matrices are described as being pre-computed and stored in a nontransitory processor-readable medium, in some implementations, the matrices may be computed on the fly in real-time.

At 1104, the at least one processor of the machine-readable symbol reader switches the laser aim pointer on. For example, the at least one processor may switch the laser aim pointer on in response to detecting that the operator has picked up the machine-readable symbol reader, or in response to detecting the operator has activated a first activation level of a dual activation level trigger.

At 1106, the at least one processor causes the imaging system of the machine-readable symbol reader to capture an image of the target object with the laser aim pointer turned on. It is noted that in this implementation, one or more images are captured without attempting to decode the 2D indicia on the target object. Rather, as discussed below, the one or more images captured at 1006 are used for estimating the rotation of the branches of the cross-shaped aiming pattern and/or for determining the distance of the target object from the reader.

At 1108, the at least one processor determines the position of the cross-shaped aiming pattern and determines the rotation angles of the horizontal branch and/or the vertical branch of the cross-shaped aiming pattern. At 1110, the at least one processor computes a homography matrix utilizing the determined position and rotation angle(s). Alternatively, in some implementations the determined position and rotation angle(s) are associated with one or more pre-computed (real time estimated) homography matrices, thus avoiding the act of calculating the exact homography every time. In this way, as soon as the rotation angle(s) of the cross-shaped aiming pattern is calculated, one or more approximate homography matrices are immediately available in a non-transitory processor-readable medium of the machine-readable symbol reader.

At 1112, the at least one processor of the machine-readable symbol reader determines the distance to the target object by analyzing a characteristic of the aiming pattern in the captured image. An example method for calculating the distance to the target object is discussed below.

At 1114, the at least one processor determines whether the target object is in a near field, a medium or "mid" field, or a far field using the determined distance. As discussed below, this field determination may be stored in a nontransitory processor-readable medium of the machine-readable symbol reader for use in determining whether to subsample a captured image used to decode the 2D indicia present on the target object.

Acts 1106, 1108, 1110, 1112 and 1114 may be repeated iteratively to check if the pose or distance of the target object relative to the machine-readable symbol reader has changed. For example, since digital watermarks are often not visible to the operator, the operator may tend to move or rotate at least one of the machine-readable symbol reader or the target object until a successful scan is obtained. Thus, by iteratively repeating the pose estimation and distance determination acts, the machine-readable symbol reader is able to have accurate estimations at the time the operator activates the actual scanning operation.

At 1116, the at least one processor receives an activation of the trigger of the machine-readable symbol reader by the operator. At 1118, the at least one processor switches the laser aim pointer off. At 1120, the at least one processor captures an image of the target object to be used for decoding the 2D indicia present on the target object.

At 1122, the at least one processor retrieves the most recent estimation of the pose of the target object from the nontransitory processor-readable medium of the machine-readable symbol reader. At 1124, the image captured at 1120 is subsampled based on the result of the field determination act at 1114. In some implementations, if the at least one processor determines the target object is in a far field, the captured image is not subsampled. If the at least one processor determines the target object is in the near field or the mid field, the captured image is subsampled to a resolution which may be specified by a digital watermarking library used in the decoding process. Generally, digital watermarking libraries work at a fixed scaling (i.e., fixed resolution) so if the image is redundant, then the image is subsampled.

At 1126, the distortion corrected image is produced using captured image, which may be subsampled, and the most recent estimation of the pose of the target object. As discussed above, the distortion corrected image may be provided to the decoder logic to decode the 2D indicia present on the target object.

Figure 12:
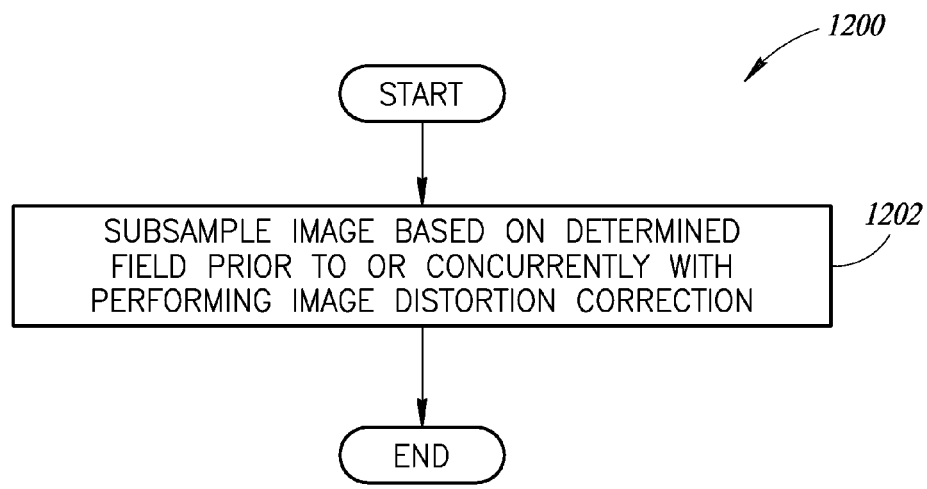
FIG. 12 is a flow diagram of a method of operation for a machine-readable symbol reader to improve the efficiency of generating a corrected image for use in decoding 2D indicia present on a target object, according to one illustrated implementation.

FIG. 12 is a flow diagram of a method 1200 of operation for a machine-readable symbol reader to improve the efficiency of generating a corrected image for use in decoding 2D indicia. The method 1200 may be performed as part of the method 1000 discussed above. At 1202, after the at least one processor determines the field and causes an image to be captured, the at least one processor subsamples the image based on the determined field prior to or concurrently with performing the distortion correction (e.g., perspective correction by homography). Thus, the image distortion correction process is much faster as the process is performed on a reduced set of pixels. That is, the homography is only calculated for the pixels that will be subsampled to reach the optimum resolution for the digital watermark library to be used to decode the 2D indicia in the captured image.

Figure 13:
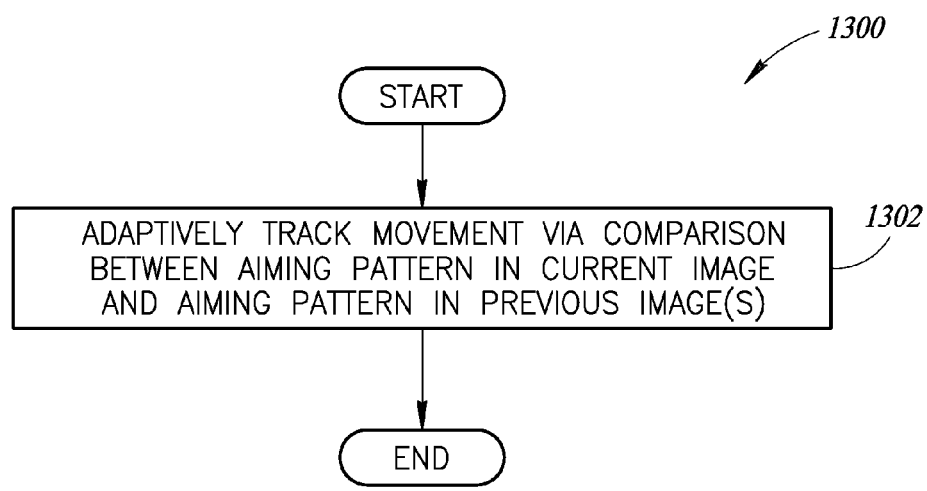
FIG. 13 is a flow diagram of a method of operation for a machine-readable symbol reader to improve the pose estimation of a target object, according to one illustrated implementation.

FIG. 13 is a flow diagram of a method 1300 of operation for a machine-readable symbol reader to improve the pose estimation of a target object. The method 1300 may be performed as part of the method 1000 discussed above. At 1302, the at least one processor may adaptively track relative movement between the machine-readable symbol reader and the target object by performing a comparison between the distortion of the aiming pattern in the most recently captured image to one or more previously captured images. In this way, the at least one processor may predict what movements (e.g., position, velocity, acceleration) the operator is making so that the best homography may be applied to a subsequently captured image which is to be used for decoding.

Figure 14:
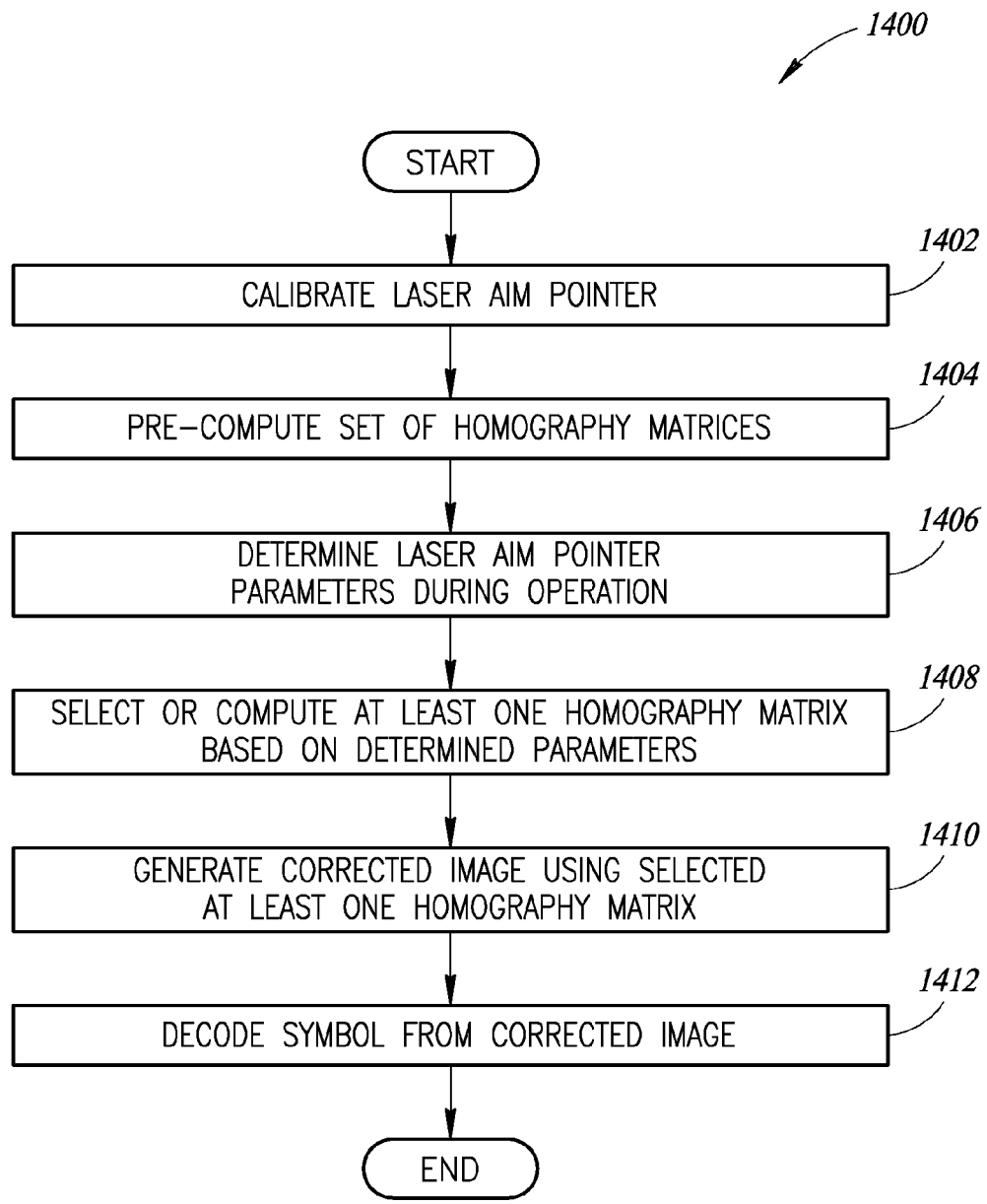
FIG. 14 is a flow diagram of a method of operation for a machine-readable symbol reader to determine and correct perspective distortion for an image captured by an imaging system used to decode 2D indicia present on a target object, according to one illustrated implementation.

FIG. 14 is a flow diagram of a low-level method 1400 of operation for a machine-readable symbol reader to determine and correct perspective distortion for an image captured by an imaging system used to decode 2D indicia on a target object.

At 1402, at least one processor calibrates a laser aim pointer or aiming system of the machine-readable symbol reader. For example, such calibration may be performed during production of the machine-readable symbol reader.

Figure 15:
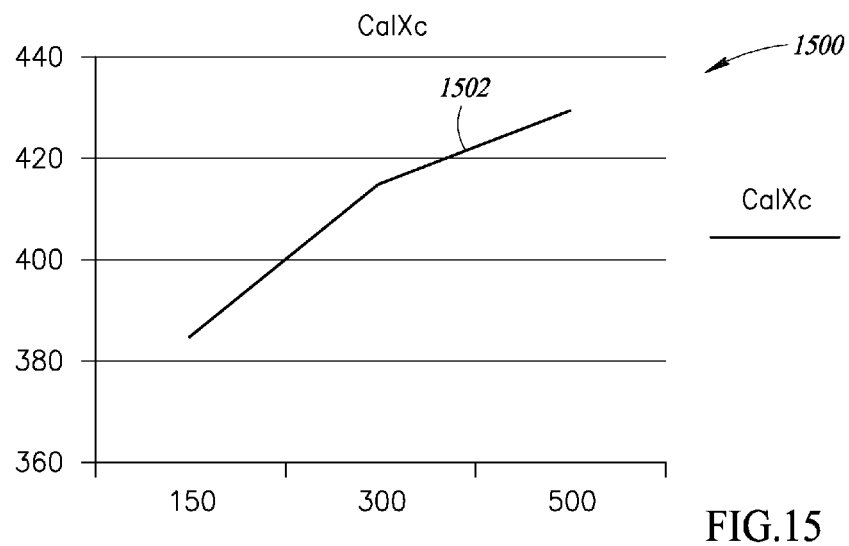
FIG. 15 is a plot of a calibration parameter indicative of a distance between a machine-readable symbol reader and a target object, according to one illustrated implementation.

An example calibration process is now described. In some implementations, the coordinates of the center of a cross-shaped aiming pattern projected on a target object are determined at a plurality of distances (e.g., 150 mm, 300 mm, 500 mm). The coordinates (CalXc, CalYc) of the center of the cross-shaped aiming patter may be expressed as a number of pixels from an origin of the image. For example, the value CalXc may represent the number of pixels in the x-direction which the center of the aiming pattern is separated from the image origin, and the value CalYc may represent the number of pixels in the y-direction which the center of the aiming pattern is separated from the image origin. FIG. 15 shows an example plot 1500 of a trend line 1502 for the value CalXc in pixels at calibration distances of 150 mm, 300 mm and 500 mm. As discussed further below, using the trend line 1502 the distance of a target object from the machine-readable symbol reader may be estimated during operation.

During the calibration process, the at least one processor also determines the slope of the horizontal branch of the cross-shaped aiming pattern, referred to as CalSH, and the inverse slope of the vertical branch, referred to as CalSV, at a number of different relative target orientations. For example, the slope and inverse slope of the horizontal branch and the vertical branch, respectively, may be determined at various combinations of (1) angles of the target plane, referred to herein as the rotation axis "RA," and (2) rotation angles around the rotation axis RA, referred to herein as "RR." For example, the slopes of the branches may be determined at 24 orientations: 12 different RAs from 0 degrees to 360 degrees with a 30 degree step size for an RR of 25 degrees, and 12 different RAs from 0 degrees to 360 degrees with a 30 degree step size for an RR of 35 degrees.

Figure 16A:
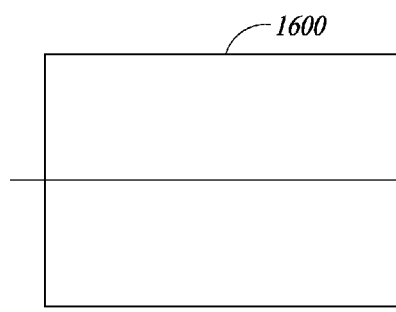
FIG. 16A-16B show the orientation of a target object at a first combination of a rotation angle of a rotation axis coplanar with the target object's plane, referred to herein as RA, and a rotation angle around the rotation axis RA, referred to herein as RR, according to one illustrated implementation.
Figure 16B:
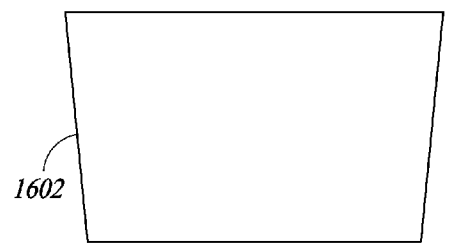
Figure 17A:
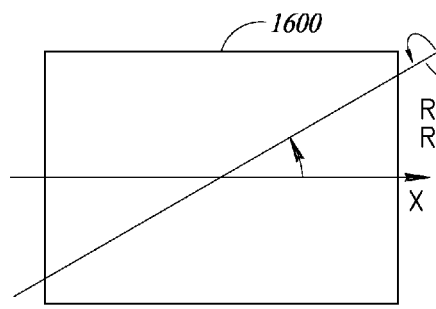
FIG. 17A-17B show the orientation of a target object at a second combination of RA and RR, according to one illustrated implementation.
Figure 17B:
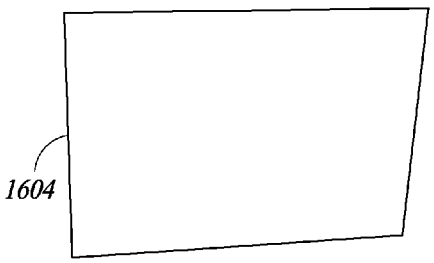

FIGS. 16A-16B, 17A-17B and 18A-18B illustrate the orientation of a rectangle 1600 at various combinations of the parameters RA and RR. The parameter RA represents the angle between a reference "X" axis and the rotation axis, while RR represents the rotation of the rectangle around the rotation axis. The rectangles 1600 shown in FIGS. 16A, 17A and 18A represent a rectangle perpendicular to the optical axis of the machine-readable symbol reader. The polygons 1602, 1604 and 1606 shown in FIGS. 16B, 17B and 18B, respectively, show the result of each rotation of the rectangles 1600, according to the RA and RR parameters of FIGS. 16A, 17A and 18A, respectively. In FIGS. 16A and 16B, RA is equal to 0 degrees and RR is equal 25 degrees. In FIGS. 17A and 17B, RA is equal to 30 degrees and RR is equal to 25 degrees. In FIGS. 18A and 18B, RA is equal to 90 degrees and RR is equal to 25 degrees.

FIG. 19 shows an example plot 1900 of the inverse slope of the vertical branch of the aiming pattern, CalSV, for three different distances, 150 mm, 300 mm, and 500 mm, with rotation angles around the rotation axis (RR) varying at steps of 10 degrees from −50 degrees to +50 degrees. In the illustrated plot 1900, the rotation axis angle of the target plane (RA) is set to 0 degrees (see FIG. 16A).

At the end of the calibration process, all of the determined parameters may be stored in a nontransitory processor-readable medium of the machine-readable symbol reader for use during operation of the reader.

Referring back to the method 1400 of FIG. 14, at 1404 the at least one processor pre-computes a set of 3×3 homography matrices. Each matrix in the set of homography matrices represents a homographic transform. As noted above, in some implementations the matrices are computed in real-time or at some other point in time before the reader scans an item.

In some implementations, 20 homography matrices may be pre-computed using the calibration parameters obtained in act 1402 of the method 1400. For example, eight matrices may represent the homographic transform corresponding to RA from 0 degrees to 360 degrees with a step size of 45 degrees, with RR fixed at 25 degrees. The other 12 matrices may represent the homographic transform corresponding to RA from 0 to 360 degrees with a step size of 30 degrees, with RR fixed at 35 degrees. In this example, homographic transforms for RR less than 25 degrees may not be required because the decoder logic may be able to decode 2D indicia from images captured with RR less than 25 degrees without requiring distortion correction.

In other implementations, more or less homography matrices may be pre-computed by selecting various combinations of RA and RR. Once the homography matrices have been pre-computed, the matrices are stored in a nontransitory processor-readable medium of the machine-readable symbol reader for use during operation. In some implementations, the homography matrices may be modified, extended, enabled, or disabled through appropriate host commands.

At 1406, the at least one processor determines the laser aim pointer parameters during a pre-reading phase of the normal operation of the machine-readable symbol reader. For example, as discussed above, the at least one processor may determine the laser aim pointer parameters an instant before a trigger is activated or as soon as motion of the reader is detected.

As noted above, the laser aim pointer parameters are determined through the analysis of images captured with the laser aim pointer turned on. The at least one processor may determine the coordinates (Xc, Yc) of the center of the cross-shaped aiming pattern, the slope of the horizontal branch of the cross-shaped aiming pattern (SH), and the inverse slope of the vertical branch of the cross-shaped aiming pattern (SV).

At 1408, the at least one processor computes at least one homography matrix or, in implementations where homography matrices have been pre-computed, selects at least one of the pre-computed homography matrices using the determined laser aim pointer parameters. In particular, the laser aim pointer parameters are compared to the calibration parameters to estimate the rotation axis angle of the target plane (estRA) and the current rotation angles around the rotation axis (estRR). The estimation may be nearest neighbors or any suitable interpolation of the calibration parameters.

Once the estRA and estRR parameters are determined, the at least one processor selects at least one of the pre-computed homography matrices that have values close to the determined estRA and estRR.

At 1410, the at least one processor generates a corrected image by performing a homographic transform of at least a portion of the captured image using the selected homography matrix. The at least a portion of the captured image may be centered around a principal point which represents the center around which the homography is computed, which is either the center of the image or the output of an optional optical calibration process.

In some implementations, a plurality of homography matrices may be selected and used to generate a corresponding plurality of corrected images which may be used sequentially as inputs for the decoding process. This feature may improve the likelihood of a successful decoding process by providing the decoder logic with multiple attempts to decode a plurality of corrected images each transformed from the original image using a different homography matrix.

At 1412, the at least one processor decodes the 2D indicia from the one or more corrected images.

Figure 20:
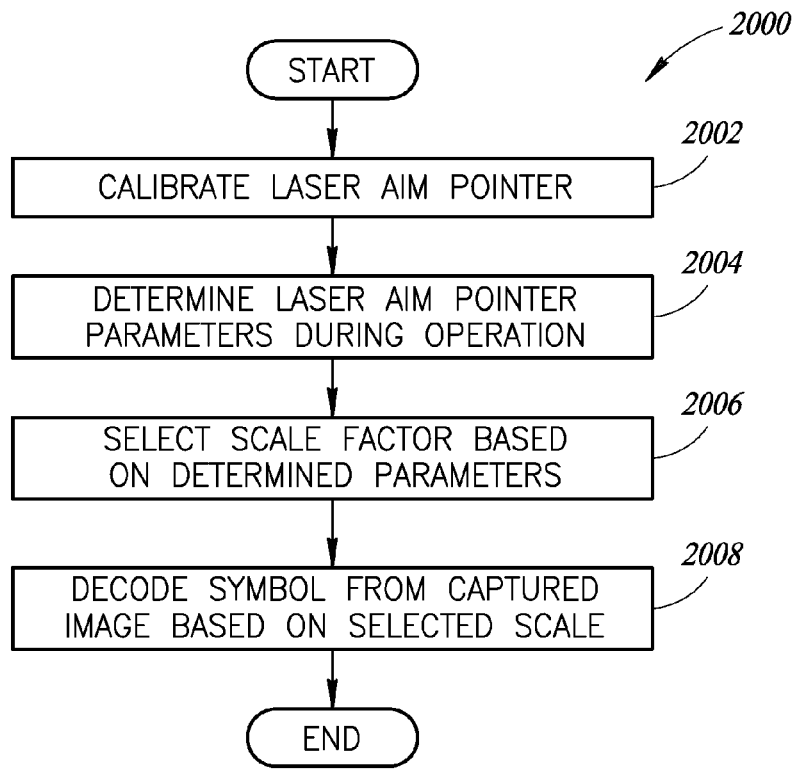
FIG. 20 is a flow diagram of a method of operation for a machine-readable symbol reader to manage image scale factor for original or corrected images, according to one illustrated implementation.

FIG. 20 shows a method 2000 of operation for a machine-readable symbol reader to manage image scale factor for original or corrected images. Generally, decoding algorithms are dependent on the scale of the indicia to be decoded. Normally, the scale is measured in pixels per element (PPE) where, in the case of a 1D machine-readable symbol, the element represents the narrowest "bar" or "space." This concept extends to 2D indicia.

When the indicia is printed at a fixed resolution, for example 13 mils, and the machine-readable symbol reader has a fixed focal length optical system, the only variable affecting the scale factor is the distance between the indicia and the machine-readable symbol reader. Thus, if the decoding algorithm may be configured to work on a given scale, the prior knowledge of which scale to use accelerates the decoding process, allowing a shorter time to read or at least a more efficient usage of computational resources.

For example, decoding algorithms may utilize different scale factors at different depths of field. In some implementations, a depth of field of 25-230 mm may correspond to a "near" scale, a depth of field of 65-370 mm may correspond to a "medium" or "mid" scale, and a depth of field of 150-775 mm may correspond to a "far" scale. In some implementations, images captured in the near scale are subsampled by a factor of 3, images subsampled in the medium scale are subsampled by a factor of 2, and images captured in the far scale are not subsampled. Hence, knowledge of the distance to the indicia allows the decoding algorithm to selectively disable the scales that are not useful.

At 2002, the at least one processor calibrates the laser aim pointer of the machine-readable symbol reader (see act 1402 of the method 1400). In particular, the coordinates of the center of the cross-shaped aiming pattern on a target object are determined at a plurality of distances (e.g., 150 mm, 300 mm, 500 mm). The coordinates (CalXc, CalYc) of the center of the cross-shaped aiming pattern may be expressed in pixels from an origin of the image, for example, optionally with sub-pixel accuracy.

At 2004, the at least one processor determines the parameters of the laser aim pointer during a pre-reading operational phase of the normal operation of the machine-readable symbol reader. For example, as discussed above, the at least one processor may determine the laser aim pointer parameters an instant before a trigger is activated or as soon as motion of the reader is detected. Specifically, the at least one processor determines the center of the cross-shaped aiming pattern (Xc, Yc).

At 2006, the at least one processor may select the best scale factor based on the determined distance of the target object to the machine-readable symbol reader. Specifically, the coordinates (Xc, Yc) of the center of the cross-shaped aiming beam may be compared to the calibrated parameters (CalXc, CalYc) to provide an estimation of the distance between the target object and the machine-readable symbol reader.

At 2008, the at least one processor may decode the 2D indicia from the capture image using the selected scale.

Advantageously, the best decoder scale is enabled according to the estimated distance, while other decoder scales are disabled. Further, as discussed above, this process may be combined with the perspective distortion correction process, directly subsampling the homographic transform at the estimated scale, and setting the decoder scale at the finest scale ("far"). This has the effect of speeding up the perspective distortion correction process by preventing the computation of data that the decoder would skip due to the configured scale.

In the examples discussed above, the laser aim pointer parameters are determined during a pre-reading phase of the normal operation of the machine-readable symbol reader. In these examples, once the reading phase begins (e.g., a trigger of the machine-readable symbol reader is activated), the laser aim pointer parameters are no longer estimated since during the reading phase the laser aiming pointer is turned off, or is at least deactivated during the actual exposure period of the imaging system. For example, the laser aiming pointer may be pulsed using strobe control so that the laser aim pointer appears switched off to the imaging system, but may still be visible to the user for the user's convenience. Thus, the estimated parameters remain fixed throughout the duration of the reading phase regardless of possible pose changes of the target object relative to the reader which may occur during the reading phase.

Figure 21:
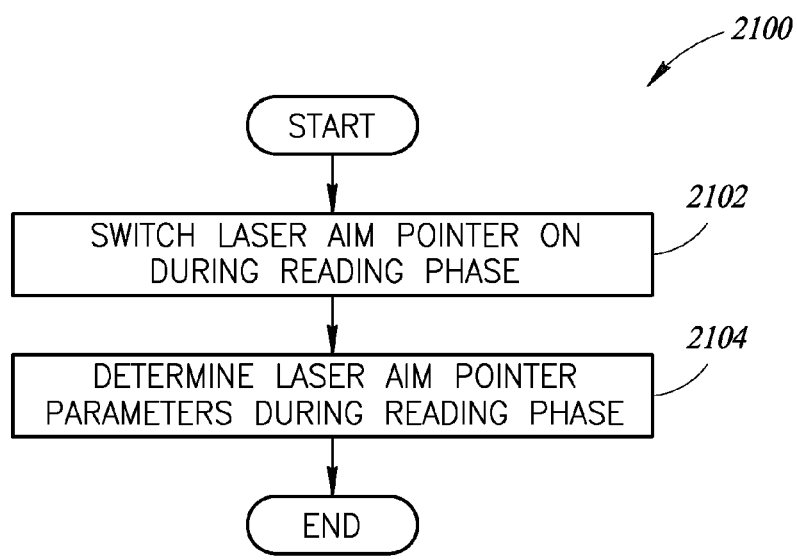
FIG. 21 is a flow diagram of a method of operation for a machine-readable symbol reader to estimate the pose of a target object during a reading phase of the machine-readable symbol reader, according to one illustrated implementation.

FIG. 21 is a flow diagram of a method 2100 of operation for a machine-readable symbol reader to estimate the pose of a target object during a reading phase of the machine-readable symbol reader. At 2102, the at least one processor of the machine-readable symbol reader switches the laser aim pointer on during the reading (or decoding) phase. For example, the laser aim pointer may be turned on for a single frame or for a few frames during the image sensor exposure of the reading phase. At 2104, the at least one processor may determine the laser aim pointer parameters during the reading phase, which may provide a more accurate estimation of the relative pose of the target in cases where the relative pose is changing during the reading phase. In some implementations, the acts 2102 and 2104 may be iteratively repeated during the reading phase so that a relatively recent estimation of relative pose of the target object is always available, which may improve the computation or selection of the appropriate transform when correcting a captured image to be decoded.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A digital watermark reader system, comprising:
    at least one imaging system which in operation captures images of a target object labeled with at least one digital watermark;
    at least one light generation system which, when activated, projects light onto the target object and when deactivated does not project light onto the target object;
    at least one processor operatively coupled to the at least one imaging system and the at least one light generation system;
    at least one nontransitory processor-readable storage medium operatively coupled to the at least one processor and storing at least one of data or instructions which, when executed by the at least one processor, cause the at least one processor to:
        activate the at least one light generation system, wherein, when activated, the at least one light generation system projects a cross-shaped aiming pattern onto the target object, the cross-shaped aiming pattern including a horizontal branch and a vertical branch;
        cause the at least one imaging system to capture at least one distortion detection image of the target object while the at least one light generation system is activated and projects light onto the target object;
        detect a rotation angle of at least one of the horizontal branch or the vertical branch of the cross-shaped aiming pattern via analysis of the at least one captured distortion detection image;
        estimate a distortion of the target object in the captured distortion detection image based at least in part on the analysis of the at least one captured distortion detection image;
        deactivate the at least one light generation system;
        cause the at least one imaging system to capture at least one watermark analysis image of the target object while the at least one light generation system is deactivated; and
        decode the at least one digital watermark present in the at least watermark analysis image based at least in part on the estimated distortion of the target object in the captured distortion detection image.

2. The system of claim 1 wherein, when activated, the at least one light generation system projects a collimated light beam having a defined shape onto the target object, and the at least one processor:
    detects a deformation of the collimated light beam relative to the defined shape via analysis of the at least one captured distortion detection image.

3. The system of claim 1 wherein the at least one light generation system comprises a three dimensional (3D) scanner, and the at least one processor:
    detects a 3D shape of the target object via analysis of the at least one captured distortion detection image.

4. The system of claim 1 wherein the at least one processor:
    estimates a three dimensional (3D) pose of the target object in the captured distortion detection image based at least in part on the analysis of the at least one captured distortion detection image; and
    decodes the at least one digital watermark based at least in part on the estimated 3D pose of the target object in the captured distortion detection image via analysis of the at least one watermark analysis image.

5. The system of claim 1, further comprising:
    a motion detector operatively coupled to the at least one processor; and
    a trigger operatively coupled to the at least one processor;
    wherein the at least one processor:
        receives a signal from the motion detector which indicates movement of the digital watermark reader system by an operator;
        responsive to the receipt of the signal from the motion detector, activates the at least one light generation system;
        receives a signal from the trigger which indicates the trigger is activated by the operator; and
        responsive to the receipt of the signal from the trigger, deactivates the at least one light generation system and causes the at least one imaging system to capture at least one watermark analysis image.

6. The system of claim 1 wherein the at least one processor:
    estimates a distance of the target object in the captured distortion detection image based at least in part on the analysis of the at least one captured distortion detection image; and
    analyzes the at least one watermark analysis image to decode the at least one digital watermark based at least in part on the estimated distance of the target object in the captured distortion detection image.

7. The system of claim 1 wherein the at least one processor:
    estimates a distortion of the target object in the captured distortion detection image by selection of at least one of a plurality of pre-computed distortion models.

8. The system of claim 1 wherein the at least one processor:
estimates a distance of the target object in the captured distortion detection image based at least in part on the analysis of the at least one captured distortion detection image; and
prior to the analysis of the at least one watermark analysis image, subsamples the at least one watermark analysis image based at least in part on the estimated distance of the target object.

9. The system of claim 1 wherein, when activated, the at least one light generation system projects an aiming pattern onto the target object, and the at least one processor:
estimates a distance of the target object in the captured distortion detection image based at least in part on a determined location of at least a portion of the aiming pattern in the at least one captured distortion detection image.

10. The system of claim 1 wherein the at least one processor:
configures a decoder based at least in part on at least one of the estimated distortion of the target object in the captured distortion detection image or an estimated distance of the target object.

11. The system of claim 1 wherein the at least one processor:
generates a transformed watermark analysis image based at least in part on the estimated distortion of the target object in the captured distortion detection image; and
provides the transformed watermark analysis image to a decoder which decodes the at least one digital watermark from the transformed watermark analysis image.

12. A method of operation for a digital watermark reader system, the digital watermark reader system including at least one imaging system which in operation captures images of a target object labeled with a digital watermark, at least one light generation system which when activated projects light onto the target object and when deactivated does not project light onto the target object, at least one processor operatively coupled to the at least one imaging system and the at least one light generation system, and at least one nontransitory processor-readable storage medium operatively coupled to the at least one processor and storing at least one of data or instructions, the method comprising:
activating, by the at least one processor, the at least one light generation system;
causing, by the at least one processor, the at least one imaging system to capture at least one distortion detection image of the target object while the at least one light generation system is activated and projects light onto the target object;
detecting, by the at least one processor, at least one characteristic of the light projected onto the target object by the at least one light generation system via analysis of the at least one captured distortion detection image;
estimating, by the at least one processor, a distortion of the target object in the captured distortion detection image based at least in part on the analysis of the at least one captured distortion detection image;
estimating, by the at least one processor, a distance of the target object in the captured distortion detection image based at least in part on the analysis of the at least one captured distortion detection image;
deactivating, by the at least one processor, the at least one light generation system;
causing, by the at least one processor, the at least one imaging system to capture at least one watermark analysis image of the target object while the at least one light generation system is deactivated; and
decoding, by the at least one processor, the at least one digital watermark present in the at least one watermark analysis image based at least in part on the estimated distortion of the target object in the captured distortion detection image and based at least in part on the estimated distance of the target object in the captured distortion detection image.

13. The method of claim 12 wherein, when activated, the at least one light generation system projects a cross-shaped aiming pattern onto the target object, the cross-shaped aiming pattern including a horizontal branch and a vertical branch, and detecting at least one characteristic of the light projected onto the target object comprises detecting a rotation angle of at least one of the horizontal branch or the vertical branch of the cross-shaped aiming pattern.

14. The method of claim 12 wherein, when activated, the at least one light generation system projects a collimated light beam having a defined shape onto the target object, and detecting at least one characteristic of the light projected onto the target object comprises detecting a deformation of the collimated light beam relative to the defined shape.

15. The method of claim 12 wherein the at least one light generation system comprises a three dimensional (3D) scanner, and detecting at least one characteristic of the light projected onto the target object comprises detecting a 3D shape of the target object.

16. The method of claim 12 wherein estimating a distortion of the target object in the captured distortion detection image comprises estimating a three dimensional (3D) pose of the target object in the captured distortion detection image based at least in part on the analysis of the at least one captured distortion detection image, decoding the at least one digital watermark comprises decoding the at least one digital watermark based at least in part on the estimated 3D pose of the target object in the captured distortion detection image.

17. The method of claim 12 wherein the digital watermark reader system comprises a motion detector operatively coupled to the at least one processor and a trigger operatively coupled to the at least one processor, and activating the at least one light generation system comprises activating the at least one light generation system responsive to receiving a signal from the motion detector which indicates movement of the digital watermark reader system by an operator, and deactivating the at least one light generation system comprises deactivating the at least one light generation system responsive to receiving a signal from the trigger.

18. The method of claim 12 wherein estimating a distortion of the target object comprises estimating a distortion of the target object in the captured distortion detection image by selection of at least one of a plurality of pre-computed distortion models.

19. The method of claim 12, further comprising:
estimating, by the at least one processor, a distance of the target object in the captured distortion detection image based at least in part on the analysis of the at least one captured distortion detection image; and
prior to the decoding of the at least one digital watermark, subsampling, by the at least one processor, the at least one watermark analysis image based at least in part on the estimated distance of the target object.

20. The method of claim 12 wherein, when activated, the at least one light generation system projects an aiming pattern onto the target object, the method further comprising:
  estimating, by the at least one processor, a distance of the target object in the captured distortion detection image based at least in part on a determined location of at least a portion of the aiming pattern in the at least one captured distortion detection image.

21. The method of claim 12, further comprising
  configuring, by the at least one processor, a decoder based at least in part on at least one of the estimated distortion of the target object in the captured distortion detection image or an estimated distance of the target object.

22. The method of claim 12, further comprising:
  generating, by the at least one processor, a transformed watermark analysis image based at least in part on the estimated distortion of the target object in the captured distortion detection image; and
  providing, by the at least one processor, the transformed watermark analysis image to a decoder which decodes the at least one digital watermark from the transformed watermark analysis image.

23. A digital watermark reader system, comprising:
  at least one imaging system which in operation captures images of a target object labeled with at least one digital watermark;
  at least one aiming system which, when activated, projects an aiming pattern onto the target object and when deactivated does not project the aiming pattern onto the target object;
  a trigger responsive to selective activation and deactivation by an operator;
  at least one processor operatively coupled to the at least one imaging system, the at least one aiming system, and the trigger;
  at least one nontransitory processor-readable storage medium operatively coupled to the at least one processor and storing at least one of data or instructions which, when executed by the at least one processor, cause the at least one processor to:
    activate the at least one aiming system;
    while the trigger is deactivated, iteratively:
      cause the at least one imaging system to capture at least one detection image of the target object while the at least one aiming system is activated and projects the aiming pattern onto the target object;
      detect at least one characteristic of the aiming pattern projected onto the target object by the at least one aiming system via analysis of the at least one captured detection image;
      estimate a distortion of the target object in the captured detection image based at least in part on the analysis of the at least one captured detection image; and
      store the estimated distortion of the target object as a latest estimated distortion in the at least one nontransitory processor-readable storage medium;
    responsive to receipt of an activation signal from the trigger:
      deactivate the at least one aiming system;
      cause the at least one imaging system to capture at least one watermark analysis image of the target object while the at least one aiming system is deactivated; and
      decode the at least one digital watermark present in the at least one watermark analysis image based at least in part on the latest estimated distortion of the target object in the captured detection image.

24. The system of claim 23 wherein the at least one processor:
  while the trigger is deactivated, iteratively:
    estimates a distance of the target object based at least in part on the analysis of the at least one captured detection image; and
    stores the estimated distance of the target object as a latest estimated distance in the at least one nontransitory processor-readable storage medium;
  responsive to receipt of an activation signal from the trigger:
    prior to the decoding of the at least one digital watermark, subsamples the at least one watermark analysis image based at least in part on the latest estimated distance of the target object.

* * * * *